(12) United States Patent
Sekiguchi et al.

(10) Patent No.: US 7,321,414 B2
(45) Date of Patent: Jan. 22, 2008

(54) LIQUID CRYSTAL DISPLAY PANEL

(75) Inventors: Kanetaka Sekiguchi, Sayama (JP); Kazutoshi Takahashi, Tokorozawa (JP); Kosei Miyabe, Kawagoe (JP); Takakazu Yano, Tokyo (JP); Takahiko Watanabe, Kanagawa (JP); Toshiaki Ishiyama, Kanagawa (JP); Shinya Ikeda, Kanagawa (JP)

(73) Assignees: NEC LCD Technologies, Ltd, Kanagawa (JP); Citizen Holdings Co., Ltd, Tokyo (JP)

( * ) Notice: Subject to any disclaimer, the term of this patent is extended or adjusted under 35 U.S.C. 154(b) by 250 days.

(21) Appl. No.: 10/508,936

(22) PCT Filed: Apr. 11, 2003

(86) PCT No.: PCT/JP03/04611

§ 371 (c)(1),
(2), (4) Date: Sep. 27, 2004

(87) PCT Pub. No.: WO03/087924

PCT Pub. Date: Oct. 23, 2003

(65) Prior Publication Data

US 2005/0253976 A1    Nov. 17, 2005

(30) Foreign Application Priority Data

Apr. 12, 2002   (JP)   ............................. 2002-110384

(51) Int. Cl.
*G02F 1/1343* (2006.01)
(52) U.S. Cl. ...................................... 349/142; 349/144
(58) Field of Classification Search ................ 349/142, 349/106, 144
See application file for complete search history.

(56) References Cited

U.S. PATENT DOCUMENTS

| 4,932,756 | A | * | 6/1990 | Spicer ........................ 349/142 |
| 5,585,949 | A | | 12/1996 | Yamazaki et al. |
| 5,754,268 | A | * | 5/1998 | Aihara et al. ................ 349/155 |
| 6,304,305 | B1 | | 10/2001 | Matsumoto et al. |
| 6,515,645 | B1 | | 2/2003 | Yano et al. |
| 6,529,257 | B1 | | 3/2003 | Nakano |
| 2002/0021391 | A1 | | 2/2002 | Yoshino |

FOREIGN PATENT DOCUMENTS

| CN | 1293380 A | 5/2001 |
| JP | 5-45645 A | 2/1993 |
| JP | 5-30834 | 4/1993 |
| JP | 2001-117072 A | 4/2001 |
| JP | 2001-183998 A | 7/2001 |

(Continued)

*Primary Examiner*—Toan Ton
(74) *Attorney, Agent, or Firm*—Sughrue Mion, Pllc.

(57) ABSTRACT

A liquid crystal display panel includes a moving image display area in which the pixel portions are arranged in a matrix shape and a pictograph display area in which the pixel portions are formed in a fixed pictograph shape. Moreover, first protective elements are inserted between the respective pixel portions in the moving image display area and a drive circuit for the pixel portions and are arranged in an outer periphery of the moving image display area. Second protective elements are inserted between the respective pixel portions in the pictogram display area and a drive circuit for the pixel portions and arranged in an outer periphery of the pictogram display area.

11 Claims, 28 Drawing Sheets

FOREIGN PATENT DOCUMENTS

| | | |
|---|---|---|
| JP | 2001-184000 A | 7/2001 |
| JP | 2002-6336 A | 1/2002 |
| JP | 2002-6787 A | 1/2002 |
| JP | 2002-55337 A | 2/2002 |
| WO | WO 01/67174 A1 | 9/2001 |

* cited by examiner

LIQUID CRYSTAL DISPLAY PANEL

TECHNICAL FIELD

The present invention relates to a liquid crystal display panel, and in particular, to a liquid crystal display panel in which both a moving image display area having pixel portions arranged in a matrix shape and a pictogram display area for displaying fixed pictograms are provided in a display area.

BACKGROUND ART

A liquid crystal display panel is widely used for portable information equipment because the liquid crystal display panel is light in weight, consumes less power, and is capable of performing display in a reflective type. Since contents to be displayed are diversified, a liquid crystal display panel of a matrix type is mainly used. In particular, development of an active matrix liquid crystal display panel, in which a switching element is formed for each pixel by reason of display quality, has been advanced.

For example, the active matrix liquid crystal display panel has plural gate electrodes arranged in an x direction, plural source electrodes arranged in a y direction, and plural thin-film transistors (TFTs) arranged at the nodes of the gate electrodes and the source electrodes on a first substrate. Display electrodes are connected to drain electrodes of thee thin-film transistors (TFTs). An opposed electrode is provided on a second substrate opposed to the first substrate on which the thin-film transistors (TFTs) are provided. Liquid crystal is encapsulated in a gap between the first substrate and the second substrate.

In the active matrix liquid crystal display panel formed in this way, an ON voltage is applied to the gate electrodes and data signal is applied to the source electrodes, whereby a predetermined voltage difference is provided between the display electrodes and the opposed electrode, and a predetermined voltage is applied to the liquid crystal to perform ON display.

Conversely, an OFF voltage is applied to the gate electrodes to bring the thin-film transistors (switching elements) into an OFF state, whereby a voltage difference does not occur between the display electrodes and the opposed electrode even if a data signal is applied to the source electrodes. This makes it possible to maintain the ON display or the OFF display. Therefore, moving image display can be performed by switching the ON and OFF signals to be applied to the gate electrodes and the data signal to be applied to the source electrodes in a temporal manner.

Moreover, combinations of pixels constituting a matrix make it possible to perform various kinds of representations. For example, the number of dots of 8×8 makes it possible to represent alphabets or numerals and the number of dots of 16×16 makes it possible to represent Chinese characters. However, with dot representation, for example it is difficult to represent a circle, a star, or a human shape with high accuracy, and problems occur in that, for example, the circle is represented as a polygon and an acute angle of the star cannot be reproduced. Therefore, when a complicated representation is performed with small pixels, a method of using a pictogram display area, in which display electrodes are constituted in an outer peripheral shape of a pictogram, is adopted.

As a liquid crystal display panel in which a moving image display area of an active matrix type and a pictogram display area of a static type are adopted for a display area, for example, there are techniques disclosed in Japanese Patent Application Laid-Open Publication No. 2001-183998 and Japanese Patent Application Laid-Open Publication No. 2001-117072.

In the active matrix liquid crystal display panel, damage to a switching element like a transistor and deterioration of liquid crystal tend to occur due to static electricity during a manufacturing process or during implementation of connection of the liquid crystal panel and an external circuit. As a result, display quality deteriorates. To prevent such deterioration of display quality due to static electricity, in the conventional active matrix liquid crystal display panel, a protective element is provided in each switching element as disclosed in, for example, Japanese Patent Application Laid-Open Publication No. H11-119256.

A display device described in Japanese Patent Application Laid-Open Publication No. 2001-183998 adopts a structure, which has thin-film transistors (TFTs) as switching elements, in a moving image display area and a structure of a static type, in which pictogram display electrodes are directly connected to wiring electrodes, is adopted in a pictogram display area. Japanese Patent Application Laid-Open Publication No. 2001-117072 discloses a technique in which an opposed electrode in a moving image display area and an opposed electrode in a pictogram display area are provided separately from each other and mutually supply optimal offset voltages. Japanese Patent Application Laid-Open Publication No. H11-119256 describes a structure in which protective elements are provided around a moving image display area.

As described above, in the conventional active matrix liquid crystal display panel, it is proposed that the pictogram display area should be provided together with the moving image display area and a measure against static electricity should be taken in the moving image display area. On the other hand, no measure is taken against static electricity that is generated in the pictogram display area. However, in actually forming the pictogram display area, electrodes for a pictogram and pictogram surrounding electrodes around a pictogram are provided according to circumstances. In this case, the electrode for a pictogram and the pictogram display surrounding electrode are adjacent to each other. Therefore, in the conventional liquid crystal display panel that does not take any measure against static electricity in the pictogram display area, there are problems in that deterioration of a gap around a pictogram due to static electricity, deterioration and seizing of liquid crystal due to static electricity, and the like occur, and high-quality display is not obtained.

As another problem, when a wiring electrode for applying a signal from the outside to the pictogram display electrodes is provided in the pictogram display area, this wiring electrode is seen from the outside to disturb display and, as a result, deteriorate display quality. When display is performed in the moving image display area and the pictogram display area simultaneously, it may become unclear which part is the moving image display area and which part is the pictogram display area, which leads to misrecognition of display.

For reduction in power consumption, display is not performed in the moving image display area but is performed only in the pictogram display area according to circumstances. However, in the conventional liquid crystal display panel, displayed contents may be mistaken because the pictogram display area is not clear. When display is performed only in the pictogram display area or a drive frequency is reduced for reduction in power consumption, if it is attempted to retain drive only with liquid crystal, display unevenness, seizing, and the like occur, and high-quality display is not obtained.

As described above, in the conventional liquid crystal display panel including the moving image display area and the pictogram display area, it is difficult to obtain a high display quality in both the display areas and perform high quality display particularly in the pictogram display area with low power consumption drive. The present invention has been devised in view of such points, and it is an object of the present invention to provide a new liquid crystal display panel in which a high display quality is obtained in both a moving image display area and a pictogram display area and display quality of the pictogram display area is never deteriorated even with low power consumption drive.

DISCLOSURE OF THE INVENTION

To attain the above-mentioned object, the present invention adopts a liquid crystal display panel having a structure described below.

A liquid crystal display panel according to an aspect of the present invention includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions. The liquid crystal display panel further includes a moving image display area in which the pixel portions are arranged in a matrix shape; a pictogram display area in which the pixel portions are formed in a fixed pictogram shape; first protective elements, for protection against static electricity, that are inserted between the respective pixel portions in the moving image display area and a drive circuit for the pixel portions and arranged in an outer periphery of the moving image display area; and second protective elements, for protection against static electricity, that are inserted between the respective pixel portions in the pictogram display area and a drive circuit for the pixel portions and arranged in an outer periphery of the pictogram display area.

The first protective elements and the second protective elements make a resistance variable according to the static electricity to reduce static electricity that is generated in at least one of the pixel portions and wiring portions thereof, and the first protective elements are connected to one another by a first common electrode, and the second protective elements are connected to one another by a second common electrode.

The first common electrode and the second common electrode are constituted by an identical common electrode.

The pictogram display area includes a pictogram display electrode having a shape of a fixed pictogram; and a pictogram display surrounding electrode that is two-dimensionally adjacent to the pictogram display electrode with a predetermined gap between the pictogram display electrodes. Uniform variable density display is made possible over substantially an entire surface of the pictogram display area by the pictogram display electrode and the pictogram display surrounding electrode, and the pictogram display electrode and the pictogram display surrounding electrode are connected to each other via the second protective elements in the outside of the pictogram display area.

The moving image display area, in which the pixel portions are arranged in a matrix shape, includes first switching elements connected to the respective pixels, and in the pictogram display area, the respective pictogram display electrodes are connected to the drive circuit via the second protective elements without the intervention of the first switching elements.

The first protective elements and the second protective elements are constituted by connecting at least two second switching elements in a ring shape and connecting at least one of the second switching elements in series.

The second switching elements are thin-film transistors consisting of an amorphous silicon film or a poly crystal silicon film.

The opposed electrodes provided on the second substrate are provided separately in the moving image display area and the pictogram display area.

The first protective elements connected to the respective pixel portions in the moving image display area are connected to the opposed electrodes that are provided to be opposed to the moving image display area, and the second protective elements connected to the respective pixel portions in the pictogram display area are connected to the opposed electrodes provided to be opposed to the pictogram display area.

The liquid crystal display panel further includes a color filter is provided on the second substrate, and the display electrodes are reflecting electrodes or semi-transmission reflecting electrodes.

A liquid crystal display panel according to another aspect of the present invention includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions. The liquid crystal display panel further includes a moving image display area in which the pixel portions are arranged in a matrix shape; and a pictogram display area in which the pixel portions are formed in a fixed pictogram shape, wherein plural pictogram display electrodes constituting the pictogram display area are wired to the outside of the pictogram display area by respective pictogram display wiring electrodes, and the respective pictogram display wiring electrodes are arranged in parallel to one another in the pictogram display area.

A pictogram display surrounding electrode, which is two-dimensionally adjacent to the pictogram display electrode with a predetermined pictogram surrounding gap between the pictogram display electrode and the pictogram display surrounding electrode, is further formed in the pictogram display area, and widths of the pictogram display wiring electrodes are narrower in the pictogram surrounding gap than other areas.

A liquid crystal display panel according to still another aspect of the present invention includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions. The liquid crystal display panel further includes a moving image display area in which the pixel portions are arranged in a matrix shape; a pictogram display area in which the pixel portions are formed in a fixed pictogram shape; and a partitioning line that divides the moving image display area and the pictogram display area.

The pictogram display area includes pictogram display wiring electrodes that wire the pictogram display electrode provided in the area to the outside of the pictogram display area, and the pictogram display wiring electrodes are arranged in an area in which the partitioning line is formed.

The partitioning line is constituted by a first partition wiring formed on the first substrate and a second partition wiring formed on the second substrate with a liquid crystal layer between the second substrate and the second partition wiring.

The partitioning line includes at least one of an area in which color filters of at least two colors are laid one on top of another and a black matrix area.

The partitioning line is an area with a reflectance lower than that of at least one of the moving image display area and the pictogram display area. Protrusions consisting of a member, which constitutes the switching elements, are provided between the pictogram display electrodes provided in the pictogram display area and the substrate, and the protrusions are electrically connected to neither the pictogram display electrodes nor the pictogram display wiring electrodes.

A liquid crystal display panel according to still another aspect of the present invention includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions. The liquid crystal display panel further includes a moving image display area in which the pixel portions are arranged in a matrix shape; and a pictogram display area in which the pixel portions are formed in a fixed pictogram shape, wherein pictogram display electrode forming the pictogram display area are connected to a third switching elements provided outside the pictogram display area via pictogram display wiring electrodes.

The third switching element is provided between the pictogram display area and a seal portion that seals the first substrate and the second substrate.

Second protective elements, for protecting against static electricity, are provided in two places on the pictogram display area side and an opposite side of the pictogram display area with respect to the third switching element.

A liquid crystal display panel according to still another aspect of the present invention includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions. The liquid crystal display panel further includes a moving image display area in which the pixel portions are arranged in a matrix shape; a pictogram display area in which the pixel portions are formed in a fixed pictogram shape; first switching elements that are arranged in the moving image display area and connected to respective pixels in the moving image display area; and protrusions for easing non-uniformity of a thickness of a liquid crystal layer in the moving image display area and a thickness of a liquid crystal layer in the pictogram display area due to the first switching elements that are arranged in the pictogram display area and arranged in the moving image display area.

The protrusions arranged in the pictogram display area are formed by a part of the first switching elements arranged in the moving image display area.

A height of the protrusions arranged in the pictogram display area is not less than half of to equal to a height of the first switching elements arranged in the moving image display area.

A height of the protrusions arranged in the pictogram display area is the same as a height of the first switching elements arranged in the moving image display area.

An area of the protrusions arranged in the pictogram display area is substantially the same as an area of the first switching elements arranged in the moving image display area.

A distribution of the protrusions arranged in the pictogram display area is substantially the same as a distribution of the first switching elements arranged in the moving image display area.

A liquid crystal display panel according to still another aspect of the present invention includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions. The liquid crystal display panel further includes a moving image display area in which the pixel portions are arranged in a matrix shape; a pictogram display area in which the pixel portions are formed in a fixed pictogram shape; first switching elements that are arranged in the moving image display area and connected to respective pixels in the moving image display area; and a light shielding black matrix that forms a pattern, which surrounds respective pixels arranged in a matrix shape, in the moving image display area and forms the same pattern as that in the moving image display area in the pictogram display area.

The pictogram display area includes a pictogram display electrode having a shape of a fixed pictogram and a pictogram display surrounding electrode that is two-dimensionally adjacent to the pictogram display electrode with a predetermined gap between the pictogram display electrode and the pictogram display surrounding electrode, and the black matrix in the pictogram display area is cut out in the gap between the pictogram display electrode and the pictogram display surrounding electrode.

A liquid crystal display panel according to still another aspect of the present invention includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions. The liquid crystal display panel further includes a moving image display area in which the pixel portions are arranged in a matrix shape; a pictogram display area in which the pixel portions are formed in a shape of a fixed pictogram by plural individual display electrodes arranged in a matrix shape, and two or more individual display electrodes are electrically connected via coupling portions; and first switching elements that are arranged in the moving image display area and connected to respective pixels in the moving image display area.

A liquid crystal display panel according to still another aspect of the present invention includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions. The liquid crystal display panel further includes a moving image display area in which the pixel portions are arranged in a matrix shape; a pictogram display area in which the pixel portions are formed in a shape of a fixed pictogram by plural individual display electrodes with different shapes arranged in a matrix shape, and the respective individual display electrodes are connected to drive circuits individually via respective pictogram display wiring electrodes; and first switching elements that are arranged in the moving image display area and connected to respective pixels in the moving image display area.

(Actions)

A display area of a liquid crystal display panel has both a moving image display area, in which pixel portions are arranged in a matrix shape, and a pictogram display area for displaying fixed pictograms, and protective elements for reducing static electricity, which is generated in the pixel portions or wiring portions connected to the pixel portions, is provided in outpour peripheries of the moving image display area and the pictogram display area. This makes it possible to disperse charges to a common electrode to which the protective elements are connected, and local occurrence of a large voltage or flow of a current can be prevented. This makes it possible to prevent deterioration of liquid crystal and damage to wiring and, in particular, prevent a difference of display qualities in the moving image display area and the pictogram display area.

Switching elements, a resistance of which can be changed largely according to a voltage, are adopted as the protective elements. This makes it possible to, in normal display, minimize a current flowing to the common electrode via the protective elements, and a consumed current can be reduced. When large static electricity is generated, since a resistance of the -protective elements falls, dispersion of charges of the static electricity to the common electrode can be attained instantly. The adoption of the switching elements is effective.

In particular, when an active matrix system for arranging a switching element for each pixel portion constituting the moving image display area is adopted, it is very effective for preventing deterioration of the switching elements and preventing damage to provide protective elements in an outer periphery of the moving image display area. As indicated in the present invention, in the pictogram display area, static electricity, which is generated in the pictogram display area simultaneously with the generation of static electricity in the moving image display area, is instantaneously subjected to charge dispersion by the protective elements in the moving image display area, and the charges can be dispersed instantaneously by the protective elements in the pictogram display area as in the moving image display area. Thus, a difference of display qualities is never caused in both the display areas.

By changing an allowable current that protective elements for moving image display, which are provided in the outer periphery of the moving image display area, and protective elements for pictogram display, which are provided in the outpour periphery of the pictogram display area, can flow, it becomes possible to prevent deterioration, up-seizing, and attain low charge consumption liquid crystal in the pictogram display area. In particular, the protective elements for moving image display. This is particularly effective for a liquid crystal panel that operates only the pictogram display area to attain low power consumption.

It is effective to connect a common electrode, to which the protective elements provided in the moving image display area are connected, and a common electrode, to which the protective element provided in the pictogram display area. However, it is more effective to provide the common electrodes separately because the common electrodes do not affect each other. When pictogram display electrodes constituting the pictogram display area are directly connected to the protective elements via a wiring electrode, since it is necessary to instantaneously flow a large current to the common electrodes via the protective elements, it is advisable to provide the common electrodes separately.

When a thin-film transistor (TFT) is adopted as a switching element for each pixel portion constituting the moving image display area, the protective elements can attain a large nonlinear resistance that is symmetrical with respect to voltages of both polarities by connecting a gate electrode and a source electrode or the gate electrode and a drain electrode of the thin-film transistor (TFT) to use the thin-film transistor (TFT) as a diode and connect this diode in a form of a ring. Thus, it is effective to adopt the thin-film transistor (TFT) as the switching element.

The protective elements can attain satisfactory nonlinear resistance characteristics by using a thin-film transistor (TFT) having an amorphous silicon or poly crystal silicon film as a semiconductor layer.

A partitioning line is provided at a boundary of the moving image display area and the pictogram display area. The partitioning line adopts a structure in which black matrixes or reflection preventive layers and black matrixes are stacked or a structure in which plural color filters are stacked to reduce a reflectance and a transmittance to be lower than those in both the display areas. This makes it possible to always clearly distinguish the moving image display area and the pictogram display area.

Pictograph display wiring electrodes are provided in an area where plural black matrixes or color filters are stacked, whereby wiring blocking a pictogram or interfering with the pictogram around the pictogram is not recognized. Thus, the pictogram can be displayed faithfully.

The partitioning line constitutes a partitioning pixel portion consisting of a first partitioning wiring and a second partitioning wiring, which are opposed to each other via liquid crystal. This makes it possible to perform blinking display or reversal display of a pictogram. Further, plural partitioning pixel portions consisting of a first partitioning line and a second partitioning line are provided, and color filters of different colors are provided in the respective partitioning pixel portions. This makes it possible to present colorful partitioning lines of colors like black, red, blue, green, white, and magenta.

When moving image display electrodes and pictogram display electrodes are reflecting electrodes or semi-transmission reflecting electrodes, it becomes possible to recognize the partitioning line by deleting the reflecting electrodes or the semi-transmission reflecting electrodes to reduce a reflectance of the partitioning line to be lower than that of the other parts. A very dark partitioning line can be attained by reducing a reflectance and stacking color filters. Alternatively, in the partitioning line, dark display is possible in reflecting display, and bright display and reverse display are possible in transmission display.

By providing a pictogram display surrounding electrode around a pictogram, the pictogram is colored black and the surrounding electrodes are colored white, or conversely, the pictogram is colored white and the surrounding electrodes are colored black, or the pictogram and the surrounding electrodes are colored the same. This makes it possible to improve visibility of the pictogram. Pictograph display wiring electrodes connected to the pictogram display electrodes are wired in a layer below the surrounding electrodes via an insulating film, or the other pictogram display wiring electrodes are arranged in a layer below the pictogram display wiring electrodes. This makes it possible to reduce an area where the pictogram display wiring electrodes are provided and prevent the pictogram display wiring electrodes from affecting the pictogram.

When the other pictogram display wiring electrodes are provided in a layer below the pictogram display electrodes via the insulating film, the pictogram display wiring electrodes are thinned in a gap around the pictogram between the pictogram display wiring electrodes and the pictogram display surrounding electrode. As a result, an optical change in liquid crystal can be prevented by the insulating film, and the optical change in liquid crystal can be made less recognizable by the thinning.

When protrusions are formed by the switching elements in the moving image display area, protrusions consisting of a member constituting the switching elements are provided in the pictogram display area. Consequently, a gap between the first substrate and the second substrate can be made uniform in the moving image display area and the pictogram display area.

A switching element outside display area connected to the pictogram display wiring electrodes is provided around the pictogram display area. By providing a switching element between the pictogram display electrodes and the external circuit, it becomes possible to control low resistance connection and high resistance connection for the external circuit and the pictogram display electrodes. In other words, when low charge consumption is performed, even if only the pictogram display area is lit and a frequency of a current alternating drive cycle of the pictogram display area is made low, a resistance of the pictogram display electrodes can be made high without depending upon a resistance of the external circuit. This makes it possible to retain charges stored in a liquid crystal capacitor between the pictogram display electrodes and the pictogram display opposed electrode, that is, to maintain display.

It is effective to provide the switching element outside display area near the protective element for pictogram display and on the liquid crystal side of a seal portion. In addition, protective elements in two parts, namely a protective element for inside pictogram display provided on the pictogram display area side and a protective element for pictogram display provided on the external circuit side, are provided with respect to the switching element outside display area. This makes it possible to protect the switching element outside display area against static electricity generated in the pictogram display area or static electricity generated in a pad portion connected to the external circuit. Thus, it is very effective to provide the protective elements.

Protrusions imitating first switching elements arranged in the moving image display area are arranged in the pictogram display area as dummy switching elements, whereby uniformity of a thickness of the liquid crystal layer of the moving image display area and a thickness of the liquid crystal layer of the pictogram display area by the first switching element can be improved. Thus, a uniform display quality can be obtained. In other words, since the display electrodes of the pictogram display area are larger than the display electrode of the moving image display area, if the switching elements such as the thin-film transistors (TFTs) are provided at a pitch equivalent to that in the moving image display area, a probability of occurrence of electrical short circuit of the switching elements increases. Thus, in the pictogram display area, it is preferable not to provide the switching elements at a pitch equivalent to that in the moving image display area and reduce the number of the switching elements compared with the moving image display area or not to provide the switching elements.

However, when the number of the switching elements in the pictogram display area is smaller than the number of the switching elements in the moving image display area, or when there is no switching element in the pictogram display area, a state of unevenness of the first substrate on which the switching elements are provided is different in the moving image display area and the pictogram display area. Then, when the first substrate and the second substrate are opposed to each other via a spacer, a quantity of a gap between the first substrate and the second substrate is difference in the moving image display area and the pictogram display area depending on the difference of the unevenness state of the first substrate. Therefore, the thickness of the liquid crystal layer of the display panel is made non-uniform, and a difference arises in display quality.

To prevent this, it is effective to make the states of unevenness identical in the first substrate identical in the moving image display area and the pictogram display area. Thus, the dummy switching elements are arranged in the pictogram display area to make the state of unevenness of the first substrate in the pictogram display area identical with the state of unevenness of the first substrate in the moving image display area, whereby the thickness of the liquid crystal layer of the moving image display area and the thickness of the liquid crystal layer of the pictogram display area are made uniform, and display quality is made uniform.

When the dummy switching elements are arranged in the pictogram display area in this way, the dummy switching elements are constituted by a part of the first switching elements in the moving image display area, whereby the dummy switching elements can be manufactured simultaneously with the first switching elements. Thus, the dummy switching elements can be arranged without imposing a burden on a manufacturing process.

A height of the dummy switching elements is reduced to about a half of a height of the first switching elements, whereby uniformity of the thickness of the liquid crystal layer in the moving image display area and the thickness of the liquid crystal layer in the pictogram display area is improved. Moreover, it is more effective if the height of the dummy switching elements is the same as the height of the first switching elements. To make the state of unevenness of the first substrate identical as much as possible in the moving image display area and the pictogram display area, it is desirable that an area of the dummy switching elements is substantially the same as an area of the first switching elements. Moreover, it is desirable that a distribution of the dummy switching elements is substantially the same as a distribution of the first switching elements.

A black matrix of the same pattern as the pattern of the black matrix in the moving image display area are provided in the pictogram display area, whereby brightness of the moving image display area and brightness of the pictogram display area can be made identical. Thus, a high display quality can be obtained. However, when the pictogram display surrounding electrode is arranged with a gap between the electrodes around the pictogram display electrodes, the black matrix is cut out in this gap, whereby an external shape of pictogram display can be displayed clearly without being blocked by the black matrix. Thus, a high display quality is obtained.

The pixel portions in the pictogram display area are constituted in a fixed pictogram shape by plural individual display electrodes that are electrically connected via coupling portions, whereby an area of the pixel portions in the pictogram display area is reduced, and a capacity load due to liquid crystal is reduced. Consequently, since a load on a drive circuit driving the pixel portions in the pictogram display area is reduced, display quality is improved.

The pixel portions in the pictogram display area are constituted in a fixed pictogram shape by plural individual display electrodes, and the respective individual display electrodes are connected to a drive circuit individually via the respective pictogram display wiring electrodes, whereby the area of the pixel portions in the pictogram display area is further reduced, and the capacity load due to liquid crystal is further reduced. Therefore, since the load on the drive circuit driving the pixel portions in the pictogram display area is further reduced, the display quality is further improved.

BEST MODE FOR CARRYING OUT THE INVENTION

First Embodiment

Exemplary embodiments of a liquid crystal display panel of the present invention will be hereinafter explained with reference to the accompanying drawings.

Figure 1:
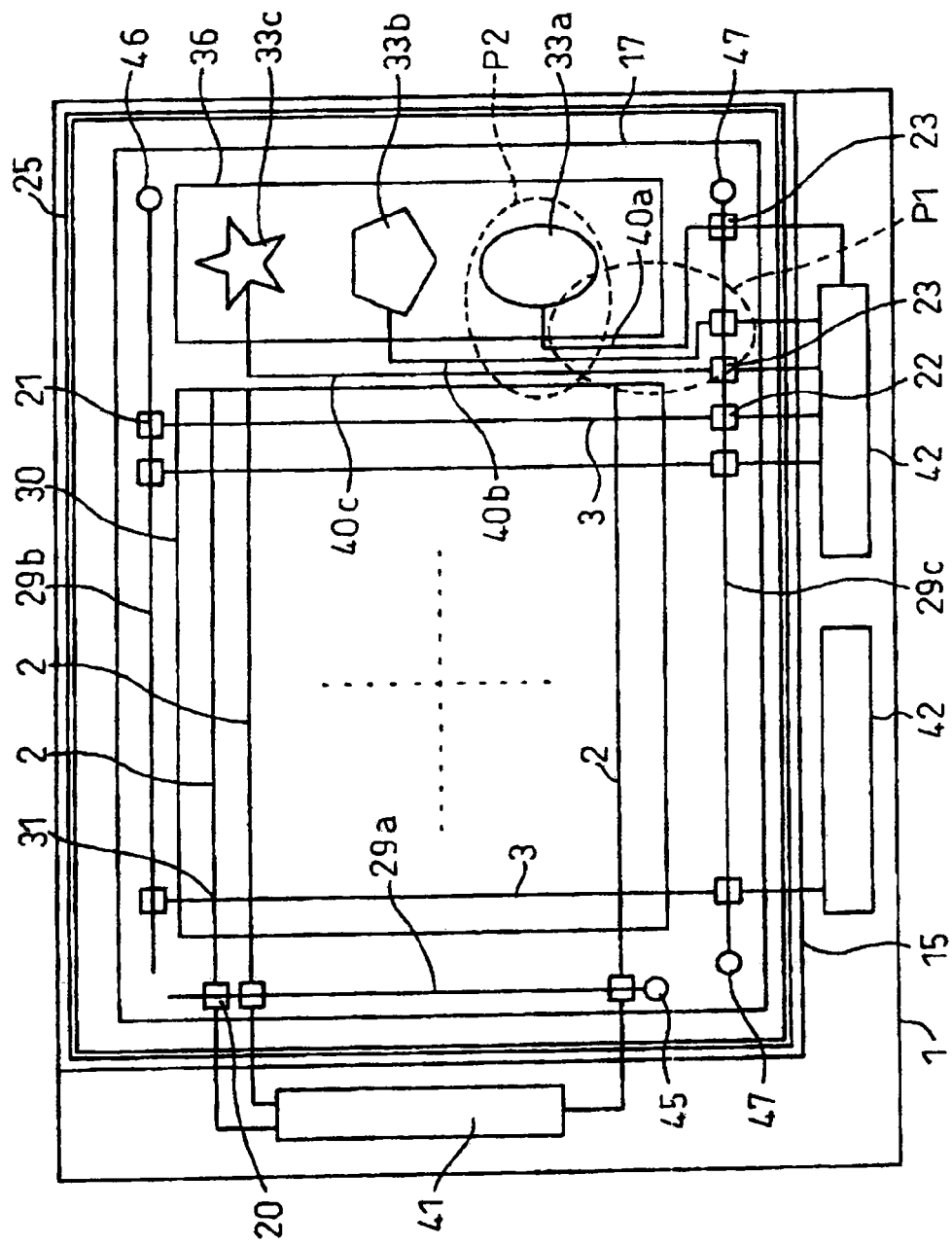
FIG. 1 is a plan view showing a liquid crystal display panel in a first embodiment of the present invention.
Figure 2:
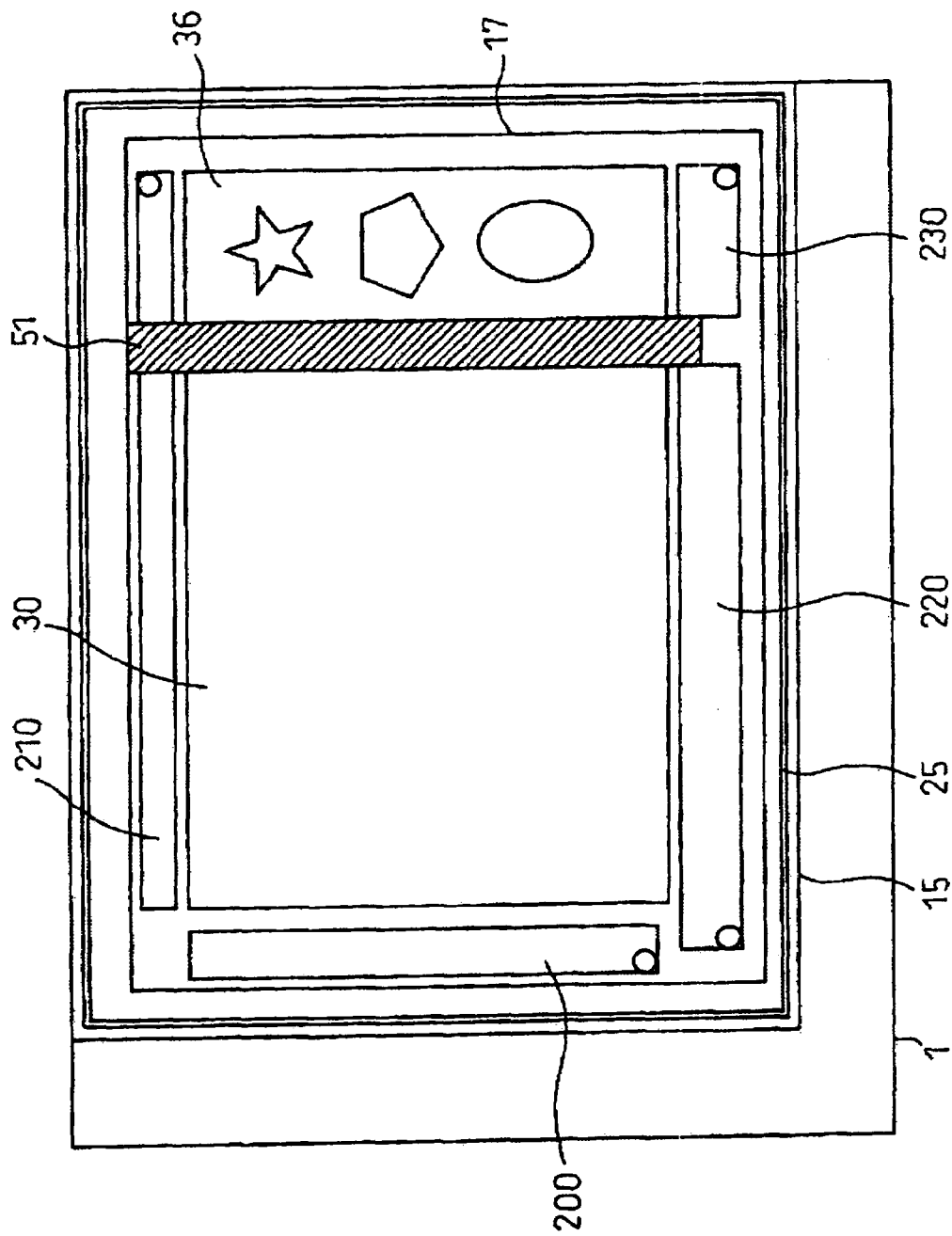
FIG. 2 is a plane schematic view showing the liquid crystal display panel in the first embodiment.
Figure 3:
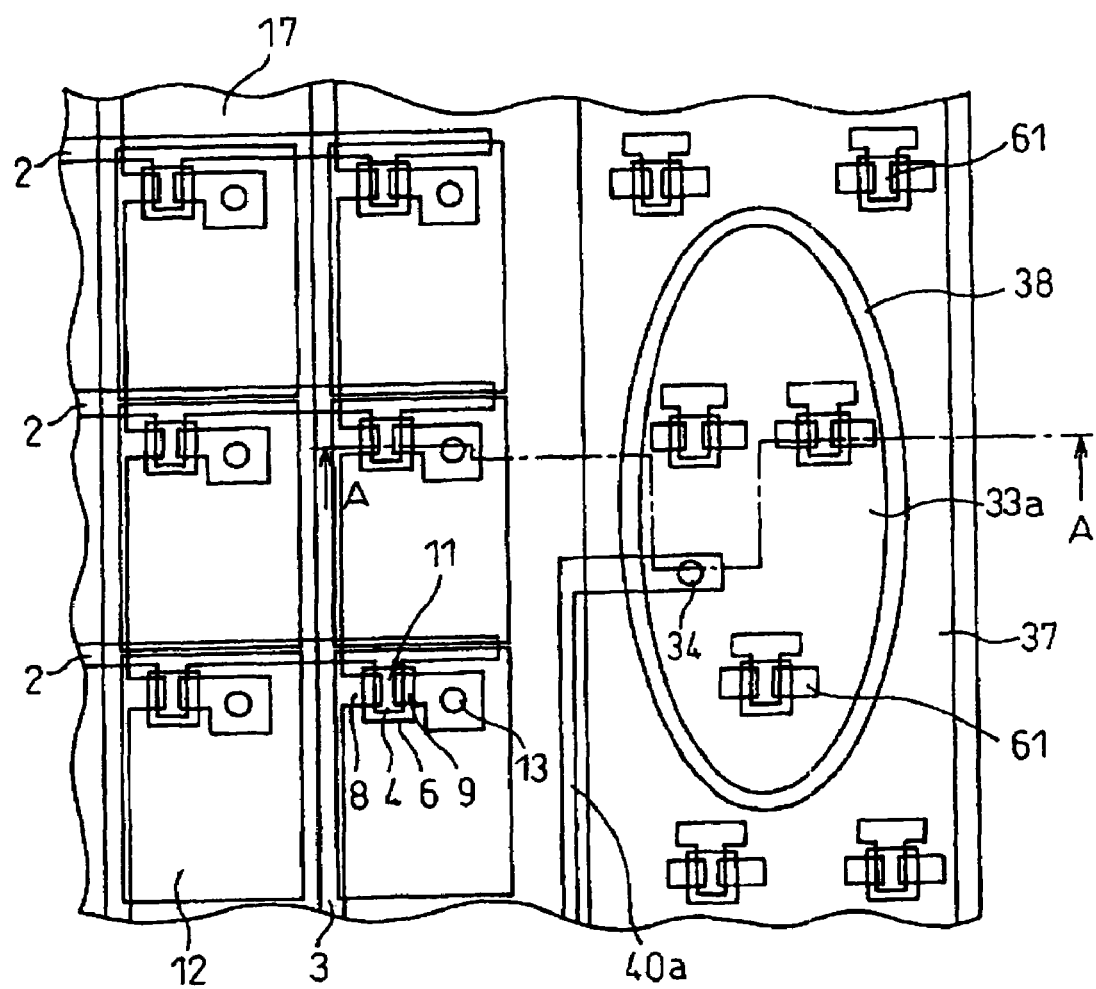
FIG. 3 is a plan view showing a part of the liquid crystal display panel in the first embodiment in enlargement.
Figure 4:
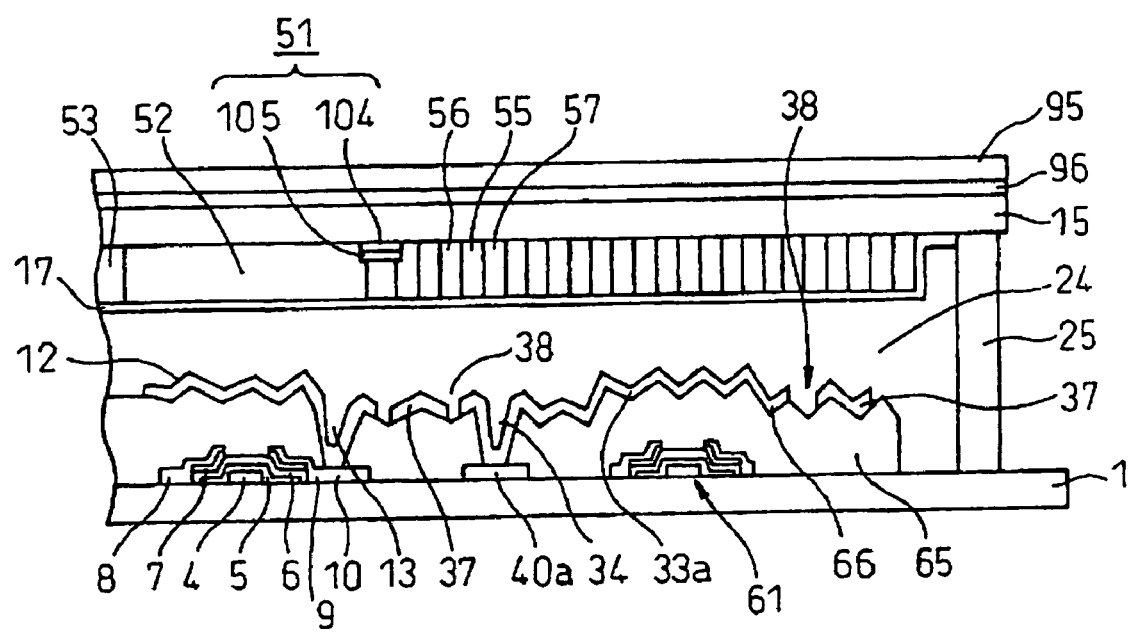
FIG. 4 is a sectional view showing the liquid crystal display panel in the first embodiment.
Figure 5:
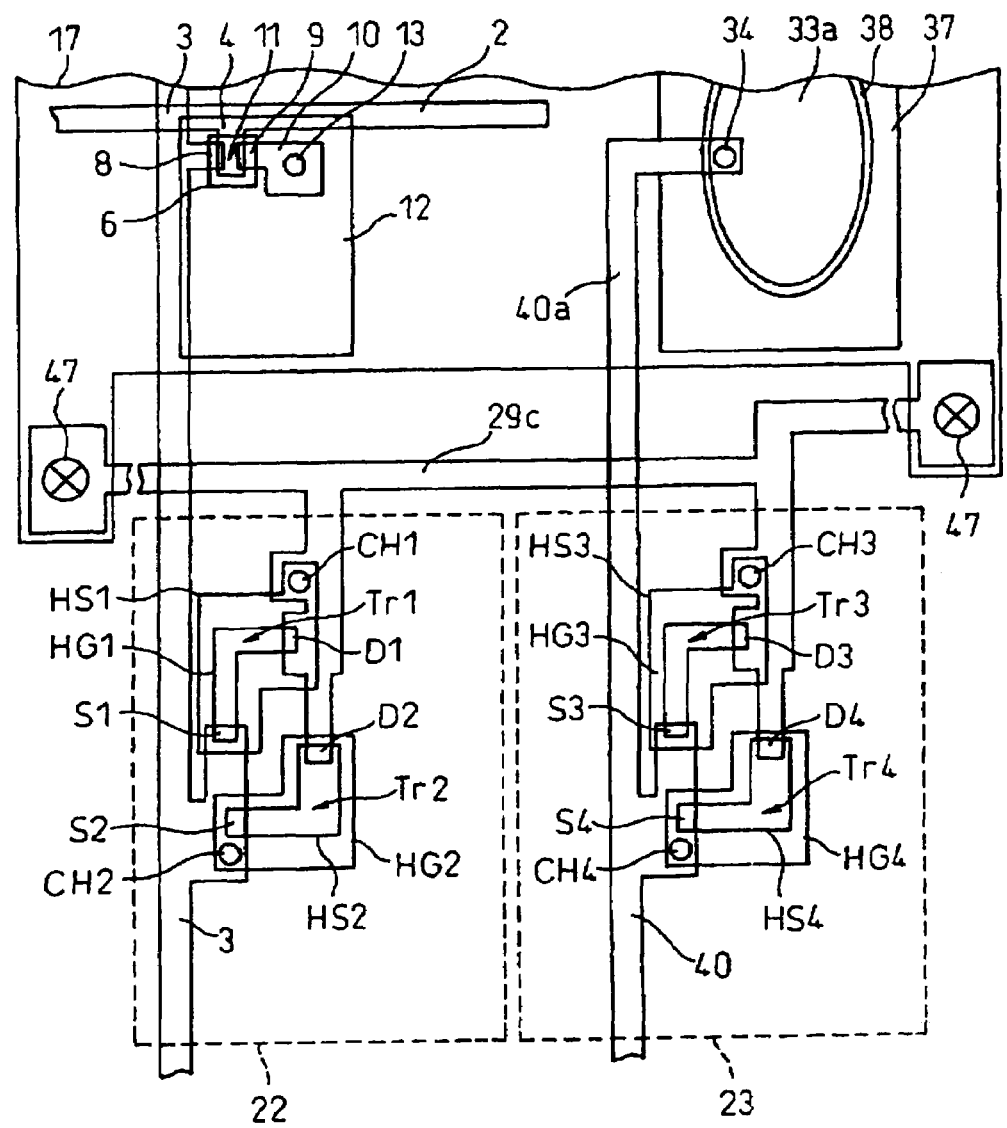
FIG. 5 is a plan view showing a periphery of protective elements of the liquid crystal display panel in the first embodiment.
Figure 6:
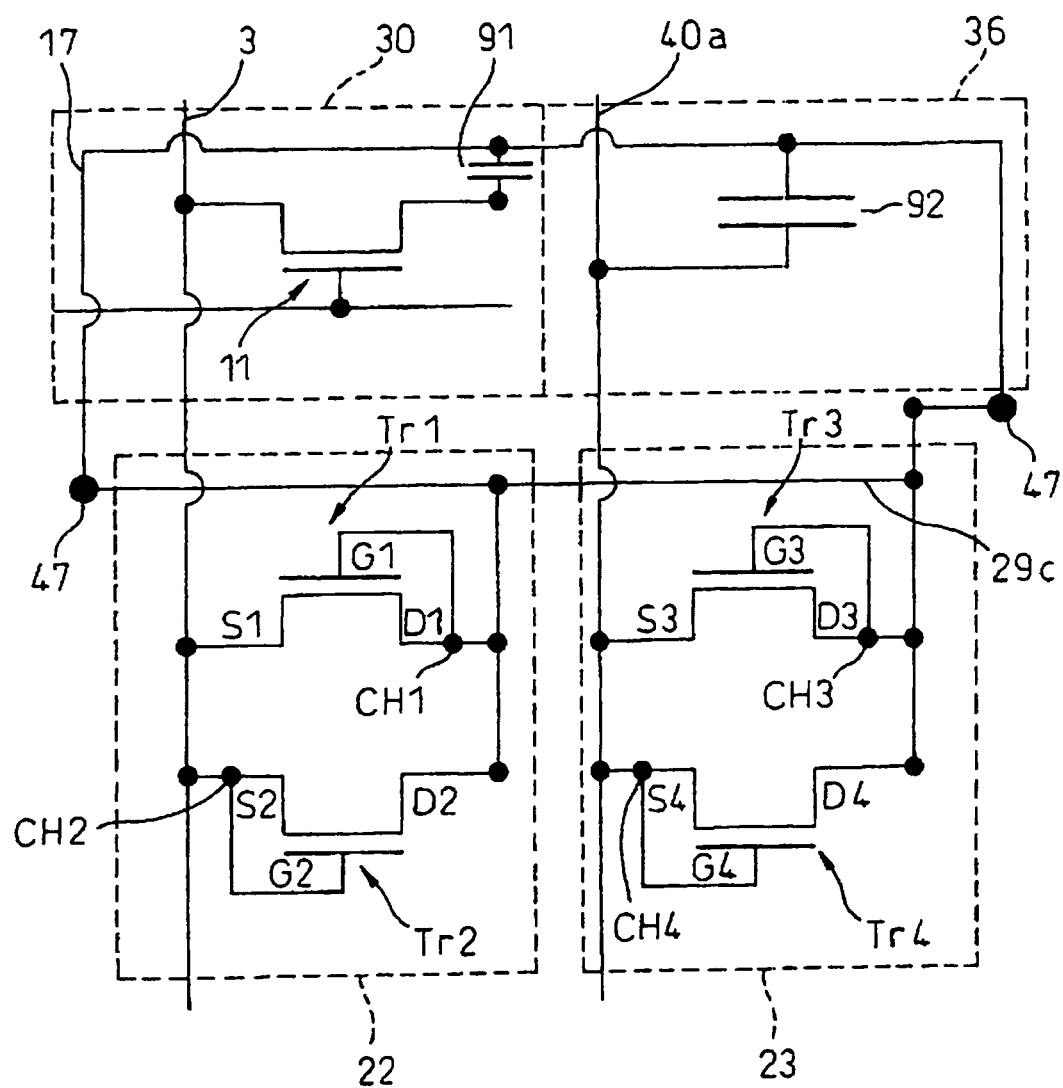
FIG. 6 is an equivalent circuit diagram showing the periphery of the protective elements of the liquid crystal display panel in the first embodiment.
Figure 7:
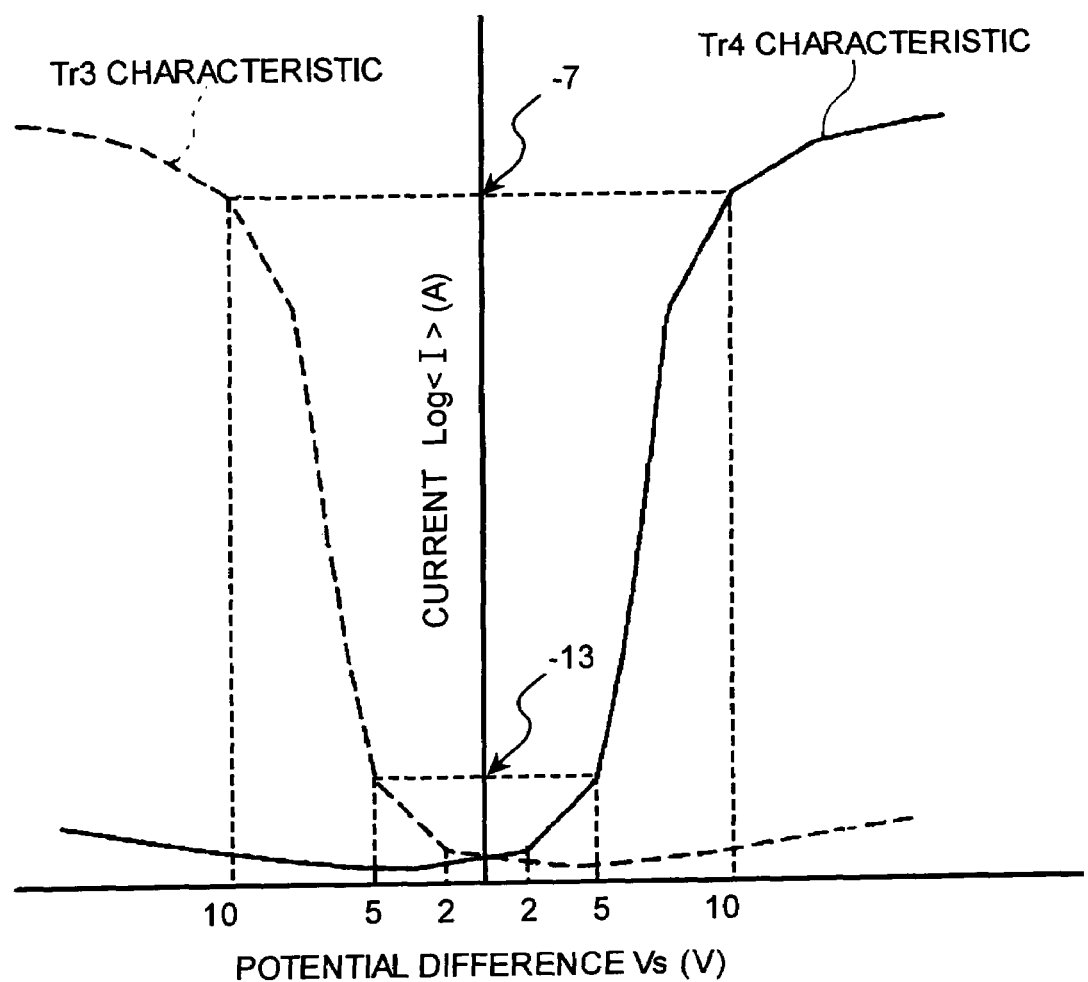
FIG. 7 is a graph showing a voltage current characteristic of the protective elements in the first embodiment.

FIG. 1 is a plan view of a liquid crystal display panel according to a first embodiment of the present invention. FIG. 2 is a plan schematic view showing the liquid crystal display panel shown in FIG. 1 with, in particular, both display areas for a moving image and a pictogram and a partitioning line between the display areas emphasized. FIG. 3 is a plan enlarged view of an area P2 shown in FIG. 1. FIG. 4 is a sectional view on line A-A in FIG. 3, and FIG. 5 is a plan enlarged view of an area P1 shown in FIG. 1. Further, FIG. 6 is an equivalent circuit diagram of the area P1, and FIG. 7 is a graph showing a change in a resistance with respect to an applied voltage at a protective element.

First, a schematic structure of the liquid crystal display panel according to the first embodiment will be explained with reference to FIGS. 1 and 2.

As shown in FIG. 1, this liquid crystal display panel includes a first substrate 1 (lower one in the figure) and a second substrate 15 (upper one in the figure) that are arranged to be opposed to each other with liquid crystal between them. The first and the second substrates 1 and 15 are sealed by a seal portion 25 made of resin, and the liquid crystal is injected in a gap of the seal. Note that the seal portion 25 is provided with an injection hole for liquid crystal, and the hole is sealed by the resin after injection of the liquid crystal. However, this portion is not shown in the figure.

This liquid crystal display panel has a moving image display area 30, a pictogram display area 36, and a partitioning line 51 (see FIG. 2), which is provided in a form of by, for example, a black matrix, between both the areas. The moving image display area 30 adopts a drive method of an active matrix system. As shown in FIG. 1, on the first substrate 1, the liquid crystal display panel includes first wiring electrodes 2, 2 . . . connected to an integrate circuit for gate drive 41, second wiring electrodes 3, 3 . . . connected to an integrated circuits for source drive 42, 42, and a thin-film transistor (TFT) element (not shown in FIG. 1) that is formed as a switching element in each pixel portion formed at an intersection point of the first and the second wiring electrodes.

The pictogram display area 36 adopts a segment system for directly connecting wiring electrodes to pictogram display electrodes without the intervention of the switching elements. In FIG. 1, reference signs 33a, 33b, and 33c denote pictogram display electrodes (represented by 33) on the first substrate 1. An opposed electrode 17 provided on the second substrate 15 is formed as one unit over both the display areas and is not formed individually in the moving image display area 30 and the pictogram display area 36. Note that detailed structures of the wiring electrodes, the display electrodes, and the thin-film transistor elements formed on the first substrate will be explained in detail later.

In FIG. 1, reference numeral 20 denotes protective elements provided between the first wiring electrodes 2 and the integrated circuit for gate drive 41; 21, protective elements provided at open ends of the second wiring electrodes 3; and 22, protective elements provided between the second wiring electrodes 3 and the integrated circuits for source drive 42. In addition, in the first embodiment, protective elements 23 are also provided between pictogram display wiring electrodes 40a, 40b, and 40c and the integrate circuits for source drive 42. Note that, for the purpose of explanation, protective elements provided with respect to a moving image display area are referred to as first protective elements, and protective elements provided with respect to a pictogram display area are referred to as second protective elements.

Reference sign 29a denotes a first common electrode that connects the first protective elements 20 to one another. One end of this electrode is connected to the opposed electrode 17 of the second substrate (upper substrate) 15 via a conductive portion 45. Reference sign 29b denotes a second common electrode that connects the first protective elements 21 to one another. One end of this electrode is connected to the opposed electrode 17 formed on the second substrate 15 via a conductive portion 46. Reference sign 29c denotes a third common electrode that connects the first protective elements 22 and the second protective elements 23 to one another. Both ends of this electrode are connected to the opposed electrode 17 formed on the second substrate 15 via conductive portions 47, 47.

The respective protective elements 20, 21, 22, and 23 are, for example, transistors that are diode-connected as described later. When a large amount of static electricity is generated in a display electrode or the like, the protective elements become conductive and play a role of discharging this static electricity to the opposed electrode 17. This prevents wiring electrodes, integrated circuits, and the like from being subjected to dielectric breakdown by the static electricity.

Note that, in the embodiment shown in FIG. 1, the conductive portions 47 are provided at both ends of the third common electrode 29c, and static electricity is discharged from both the ends of the electrode 29c. This is because the electrode 29c plays a role of discharging a large amount of static electricity, which is generated in the pictogram display electrodes 33, via the protective elements 23.

As shown in FIG. 2, the pictogram display wiring electrodes 40a, 40b, and 40c (represented by 40) are arranged below the partitioning line 51 consisting of the black matrixes provided between the moving image display area 30 and the pictogram display area 36. Thus, these wiring electrodes are never seen from the outside.

In FIG. 2, reference numeral 200 denotes an area in which the first protective elements 20 are formed; 210, an area in which the first protective elements 21 are formed; 220, an area in which the first protective elements 22 are formed; and 230, an area in which the second protective elements 23 are formed. As shown in the figure, these areas are provided in outer peripheral parts of the moving image display area 30 and the pictogram display area 36.

Detailed structure of this liquid crystal display panel will be hereinafter explained with reference to FIGS. 3 to 7.

On the first substrate 1, the first wiring electrodes 2 consisting of a chromium-molybdenum film, gate electrodes 4 extended to the first wiring electrodes 2, and a common electrode 29c, to which the protective elements for source side moving image display 22 and the protective elements for pictogram display 23 are connected, are provided.

Gate insulating films 5 consisting of a silicon nitride film are provided on the first substrate 1 and the respective electrodes. Semiconductor layers 6 consisting of an amorphous silicon (a-Si) film are provided on the gate insulating films 5. In addition, source electrodes 8 consisting of a chrome film serving as the second wiring electrodes 3, drain electrodes 9, the pictogram display wiring electrodes 40, and the common electrode 29a of the protective elements for gate side moving image display 20 are provided.

Impurity doped semiconductor layers 7 are provided among the semiconductor layers 6, the source electrodes 8, and the drain electrodes 9 to perform reduction in a connection resistance and improvement of a diode characteristic. With the above structure, switching elements 11 consisting of thin-film transistors (TFTs) are formed.

A pixel portion 31 (see FIG. 1), which is arranged in an intersection point of each of the first wiring electrodes 2 and the second wiring electrode 3 crossing the first wiring electrode 2, has the switching element 11, and a drain connection electrode 10 is connected to a drain electrode 9 of the switching element 11. An uneven organic film 65 consisting of acrylic resin, which has unevenness on a surface thereof, is formed on the substrate mentioned above. The uneven organic film 65 has a conductive hole for display electrodes 13 on the drain connection electrode 10 and is connected to a display electrode 12 consisting of a reflecting electrode of an aluminum film that is provided on the uneven organic film 65.

The pictogram display wiring electrodes 40 (for simplification of illustration, only the wiring electrode 40a of the pictogram display electrode 33a is shown in FIGS. 3 to 5)

have a conductive hole for pictogram display 34 and are connected to the pictogram display electrode 33 consisting of a reflecting electrode of an aluminum film that is provided on the uneven organic film 65. A pictogram display surrounding electrode 37 is formed of a reflecting electrode of an aluminum film around the pictogram display electrode 33 and is connected to a pictogram display surrounding wiring electrode via a conductive hole (not shown).

As shown in FIG. 4, on the second substrate 15 opposed to the first substrate 1 with a predetermined gap between the substrates, a red color filter 52, a green color filter 53, and a blue color filter 54, which have a pitch slightly larger than the display electrode 12, are provided in an area corresponding to the moving image display area 30. A fine red color filter 55, a fine green color filter 56, and a fine blue color filter 57, which have a size about ⅓ of the pitch of the respective color filters 52, 53, and 54, are provided in an area opposed to the pictogram display area 36. Note that the blue color filter 54 is not shown in FIG. 4.

A black matrix (light shielding layer) 105, which is formed by sequentially stacking a reflection preventing layer 104 consisting of a chromium oxide film and a chrome film from the second substrate 15 side, is provided between the second substrate 15 and the color filters. The reflection preventing layer 104 and the black matrix 105 are provided as the partitioning line 51 at a boundary of the moving image display area 30 and the pictogram display area 36. These are further provided in an area overlapping the protective elements for moving image display 21 and 22 provided in the outer periphery of the-moving image display area 30 and an area overlapping the protective element for pictogram display 23 provided in the outer periphery of the pictogram display area 36.

The color filters provided in the moving image (105) display area 30 are arranged in stripe, mosaic, or delta, and the pictogram display area 36 adopts a delta arrangement. The fine color filters in the pictogram display area 36 adopt an arrangement in which hexagonal fine color filters of plural sizes are packed closely and areas of red, green, and blue in plural sets have chromaticity identical with red, green, and blue of the moving image display area 30. This prevents a specific color from being seen in an outer periphery of a pictogram with respect to the star pictogram 33c or a pentagonal or circular pictogram 33a or 33b shown in FIG. 1.

The reflection preventing layer 104 and the black matrix 105 are not provided between the color filters provided in the moving image display area 30 and between the fine color filters provided in the pictogram display area 36. Since pitches, that is, numbers present in a fixed area, of the color filters and the fine color filters are different, it is very difficult to control a manner of overlapping the black matrix 105 and the color filters and a manner of overlapping the black matrix 105 and the fine color filters. Thus, it is effective for forming both the display areas with identical color tone to provide the color filters close to one another or partly place one color filter on top of another. Therefore, the reflection preventing layer 104 and the black matrix 105 are not provided.

Next, on the second substrate 15, the opposed electrode 17 consisting of a transparent conductive film is provided in an area extending from the moving image display area 30 and the pictogram display area 36 to the peripheries thereof. On the first substrate 1 and the second substrate 15 described above, oriented films (not shown) consisting of polyimide resin are formed, subjected to orientation treatment, and adhered with a predetermined gap provided by the seal material 25 and a spacer (not shown). Liquid crystal 24 is introduced into the gap via a hole sealing portion, and the gap is sealed after that.

A phase difference plate 96 and a polarizing plate 95 are stacked in this order on a surface opposite to the liquid crystal 24 of the second substrate 15. The liquid crystal display panel of the present invention is constituted as described above. The common electrode 29a of the gate side protective element for moving image display 20 and the opposed electrode 17, which are provided around the moving image display area 30, are connected by the conductive portion 45, the common electrode 29b of the source side protective element for moving image display 21 and the opposed electrode 17 are connected by the conductive portion 46, and the common electrode 29c, which is commonly connected to the protective element for moving image display 22 and the protective element for pictogram display 23, and the opposed electrode 17 are connected by the two conductive portions 47, 47.

The first wiring electrodes 2 are connected to the integrated circuit for gate drive 41 provided on the first substrate 1 and make it possible to apply a predetermined signal. The second wiring electrodes 3, the pictogram display wiring electrodes 40 (40a, 40b, and 40c), and the pictogram display surrounding electrode 37 are connected to the integrated circuit for source drive 42 provided on the first substrate and make it possible to apply a predetermined signal. The opposed electrode 17 provided on the second substrate 15 is connected to the integrated circuit for gate drive 41 or the integrated circuit for source drive 42 provided on the first substrate 1 via upper and lower conductive portions (not shown).

As shown in FIG. 3, in the pictogram display area 36, protrusions 61, which consist of a part or all of the members constituting the switching elements 11 provided in the respective pixel portions 31 of the moving image display area 30, are arranged in a density substantially equal to a density of the switching elements 11 of the moving image display area 30.

The pictogram display wiring electrodes 40 are provided in a layer below the pictogram display surrounding electrode 37 via an insulating film. Thus, the pictogram display wiring electrodes 40 are only seen slightly in a pictogram surrounding gap 38 between the pictogram display electrode 33 and the pictogram display surrounding electrode 37.

With the above-mentioned structure, a liquid crystal display panel is obtained which has the gate side protective elements for moving image display 20 arranged on one side, the source side protective elements for moving image display 21 and 22 arranged on two sides, and the protective element for pictogram display 23 provided outside the pictogram display area 36 around the moving image display area 30, and has the partitioning line 51 consisting of the reflection preventing layer 104 and the black matrix 105 at the boundary of the moving image display area 30 and the pictogram display area 26.

Next, the protective elements for moving image display 22 and the protective elements for pictogram display 23 will be explained using FIG. 5 and FIG. 6 showing an equivalent circuit of FIG. 5. Note that the respective protective elements and common electrodes basically have the same structure. A moving image display pixel portion connected to the drain electrode of the switching element 11 is formed in the moving image display area 30. In FIG. 6, this moving image display pixel portion is denoted by reference numeral 91. The second wiring electrode 3 connected to the source electrode 8 extends to the outer periphery of the moving image display area 30 and is connected to a source electrode S1 of a first transistor Tr1 constituting the protective element 22 and a source electrode S2 of a second transistor Tr2 and connected to a second gate electrode HG2 via a conductive hole CH2.

The third common electrode 29c is connected to a drain electrode D1 of the first transistor Tr1, connected to a first gate electrode HG1 via a conductive hole CH1, and connected to a drain electrode D2 of the second transistor Tr2. The first drain electrode D1 and the first gate electrode G1 are connected to the first transistor Tr1. As a result, when the electrode D1 and the electrode G1 have a high potential compared with the first source electrode S1, it becomes possible to flow a current from the electrode D1 side to the electrode S1 side. In other words, the first transistor Tr1 is diode-connected.

Similarly, the second source electrode S2 and the second gate electrode G2 are connected to the second transistor Tr2. When the electrode S2 and the electrode G2 have a high potential compared with the second drain electrode D2, it becomes possible to flow a current from the electrode S2 side to the electrode D2 side. In other words, the second transistor Tr2 is also diode-connected.

These two transistors Tr1 and Tr2 are further connected in a ring shape and function as a ring diode. In other words, when the second wiring electrode 3 has a potential lower than that of the common electrode 29c, a current is flown from the common electrode 29c to the second wiring electrode 3 by the first transistor Tr1 to reduce the potential to zero. Conversely, when the second wiring electrode 3 has a potential higher than that of the common electrode 29c, a current is flown from the second wiring electrode 3 to the common electrode 29c by the second transistor Tr2 to reduce the potential to zero.

Similarly, in the pictogram display area 36, there is a pictogram display pixel portion 92 including the pictogram display electrode 33, the opposed electrode 17, and liquid crystal. The pictogram display wiring electrodes 40 connected to the pictogram display electrode 33 extend to the outer periphery of the pictogram display area 36 and are connected to a source electrode S3 of a third transistor Tr3 and a source electrode S4 of a fourth transistor Tr4 and connected to a fourth gate electrode HG4 via a conductive hole CH4.

A common electrode for pictogram display is integral with a common electrode for moving image display. This common electrode 29c is connected to a drain electrode D3 of the third transistor Tr3, connected to a third gate electrode HG3 via a conductive hole CH3, and connected to a drain electrode D4 of the fourth transistor Tr4. The third transistor Tr3 and the fourth transistor Tr4 are connected in a ring shape, and neutralization of charges can be attained by the transistors Tr3 and Tr4 according to a potential difference between the pictogram display wiring electrodes 40 and the third common electrode 29c.

The third common electrode 29c is connected to the opposed electrode 17 provided on the second substrate 15 by the conductive portions 47, 47 provided at both ends of the common electrode 29c. Note that, in FIGS. 5 and 6, to simplify the drawings, only the wiring electrode 40a corresponding to the pictogram display electrode 33a and the protective element 23 connected to this wiring electrode 40a are shown. However, it should be noted that, actually, there are the pictogram display electrodes 33b and 33c, the wiring electrodes 40b and 40c (see FIG. 1) corresponding to these display electrodes, and protective elements connected to these wiring electrodes 40b and 40c. Further, in FIGS. 1, 3, and 5, it should be noted that the partition plate 51 consisting of the black matrix is not shown either from the viewpoint of facilitating understanding of the drawings.

A voltage current characteristic of a protective element used in the present invention will be explained using FIG. 7. FIG. 7 shows a characteristic of a protective element for pictogram display as an example of the protective element. The horizontal axis is equivalent to a potential difference Vs between the pictogram display wiring electrodes 40 and the common electrode 29c, and the vertical axis represents a current flowing to the transistor Tr3 and the transistor Tr4. A current flowing at the potential difference Vs of 0 volt to 2 volts has an extremely high resistance at $10^{-13}$ amperes (A). When the potential difference Vs exceeds 5 volts, a current flows suddenly, and when the potential difference Vs reaches 10 volts, the current has a low resistance at $10^{-7}$ amperes (A). It is seen that a resistance changes largely.

Even if positive (+) static electricity or negative (−) static electricity is generated in the pictogram display wiring electrodes 40, a large current flows according to a large change in resistance of the protective element for pictogram display 23, and charges can be neutralized instantly. When a predetermined voltage is applied to the pictogram display wiring electrodes 40 to display a pictogram, since the protective element for pictogram display 23 has a sufficiently high resistance, almost no leak occurs in the pictogram display wiring electrodes 40 and the common electrode 29c. Thus, almost no power consumption is required.

As it is evident from the above explanation, by providing a protective element for pictogram display in an outer periphery of a pictogram display area, deterioration of liquid crystal due to static electricity, a display difference (a difference in brightness and color tone of an area) between a pictogram and a part around-pictogram display, or damage to the outer periphery due to spark of a pictogram display electrode and a pictogram display surrounding electrode never occurs. Further, by providing a partitioning line consisting of a reflection protecting layer and a black matrix at a boundary of a moving image display area and a pictogram display area, it becomes possible to always distinguish the moving image display area and the pictogram display area. Moreover, it becomes possible to make brightness and color tone of the moving image display area and those of the pictogram display area equal.

Incidentally, Japanese Patent Application Laid-Open Publication No. H5-45645 discloses a liquid crystal display device in which an area for performing color video image display (corresponding to the moving image display area in the first embodiment) and an area or performing black and white character display (corresponding to the pictogram display area in the first embodiment) on an identical display panel. However, in the liquid crystal display device disclosed in this laid-open patent application, since a partitioning line as in the first embodiment is not provided at a boundary of the two display areas, a viewer may misrecognize display in the two areas, which is not preferable. On the other hand, in the first embodiment, since the partitioning line is provided at the boundary of the moving image display area and the pictogram display area, a viewer can recognize display in the two areas accurately.

Japanese Patent Application Laid-Open Publication No. 2002-55337 discloses a liquid crystal display device in which a display portion of a cellular phone is divided into a transmission color display area and a semi-transmission black and white display area, and a black matrix provided on a transmission color display screen is slightly extended to the semi-transmission black and white display screen. This black matrix is provided for the purpose of preventing light of a backlight used in the transmission color display screen from leaking to a black and white display screen and is not used as a boundary line of the transmission color display area and the semi-transmission black and white display area. This is also evident from the fact that Japanese Patent Application Laid-Open Publication No. 2002-55337 does not clearly indicate that the black matrix forms a boundary line of the two display areas. On the other hand, the partitioning line of the first embodiment is provided for clarifying the boundary of the moving image display area and the pictogram display area and has a technical idea completely different from that disclosed in the above-mentioned laid-open patent application.

Second Embodiment

A liquid crystal display panel according to a second embodiment of the present invention will be hereinafter explained with reference to FIGS. 8, 9, 10A, and 10B. Note that, in all explanations below, components identical with or similar to those in the first embodiment are referred to with the same reference numerals and signs. Therefore, detailed explanations of the components will be omitted.

Figure 8:
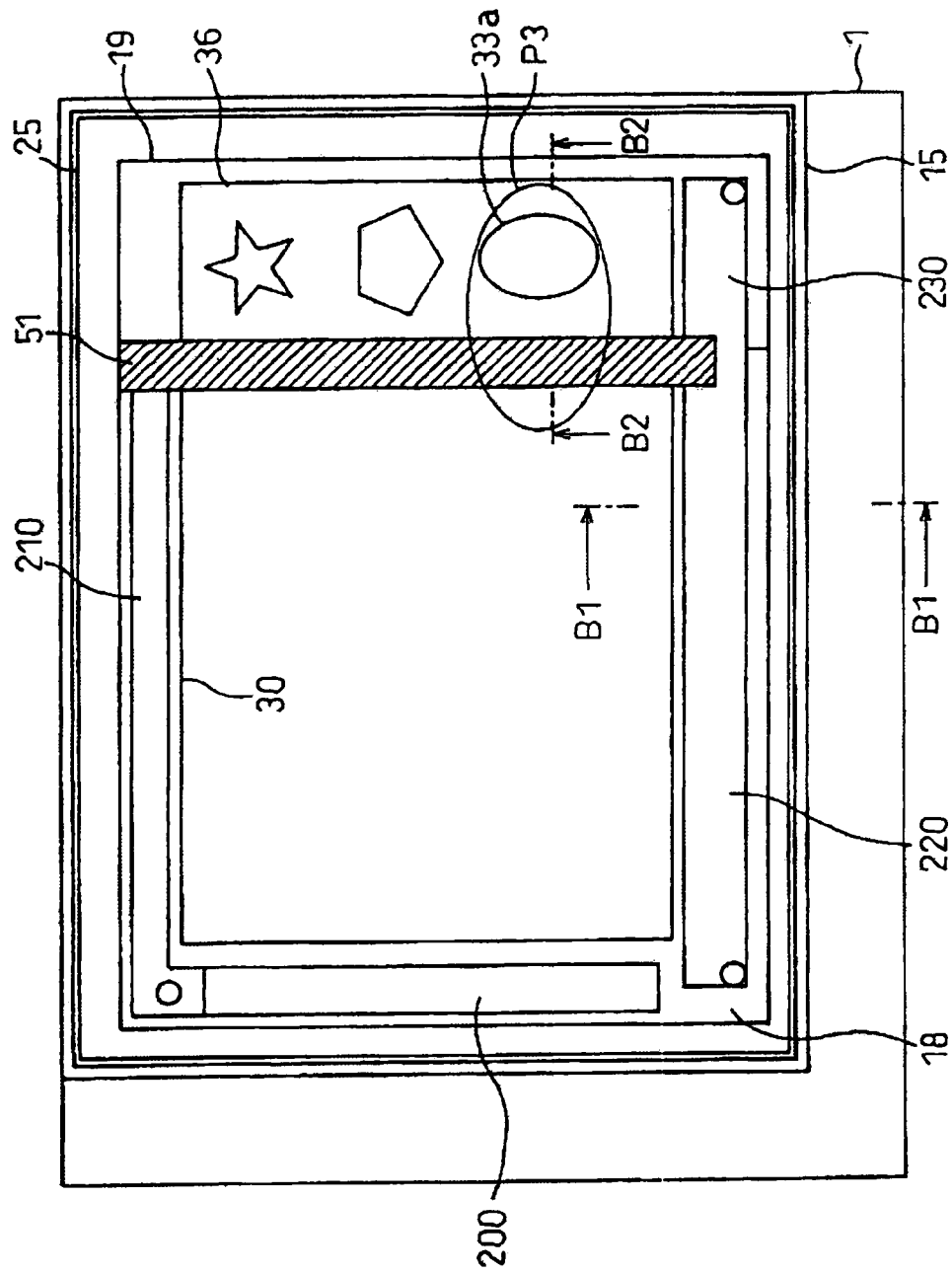
FIG. 8 is a plan schematic view showing a liquid crystal display panel in a second embodiment of the present invention.

Characteristics of the liquid crystal display panel according to the second embodiment are that, in the moving image display area 30, a passive matrix system for directly connecting respective wiring electrodes to moving image display pixels without the intervention of switching elements is adopted, and a passive system (static: segment system) for directly connecting wiring electrodes to pictogram display electrodes without the intervention of switching elements is also adopted for the pictogram display area 36. In the second embodiment, unlike the first embodiment, opposed electrodes are formed separately in the moving image display area 30 and the pictogram display area 36. In FIG. 8, an opposed electrode for the moving image display area 30 is denoted by reference numeral 18, and an opposed electrode for the pictogram display area 36 is denoted by reference numeral 19. In the second embodiment, the partitioning line 51 is provided between the moving image display area 30 and the pictogram display area 36. This partitioning line is made of black resin obtained by dispersing a black pigment in acrylic resin.

Figure 9:
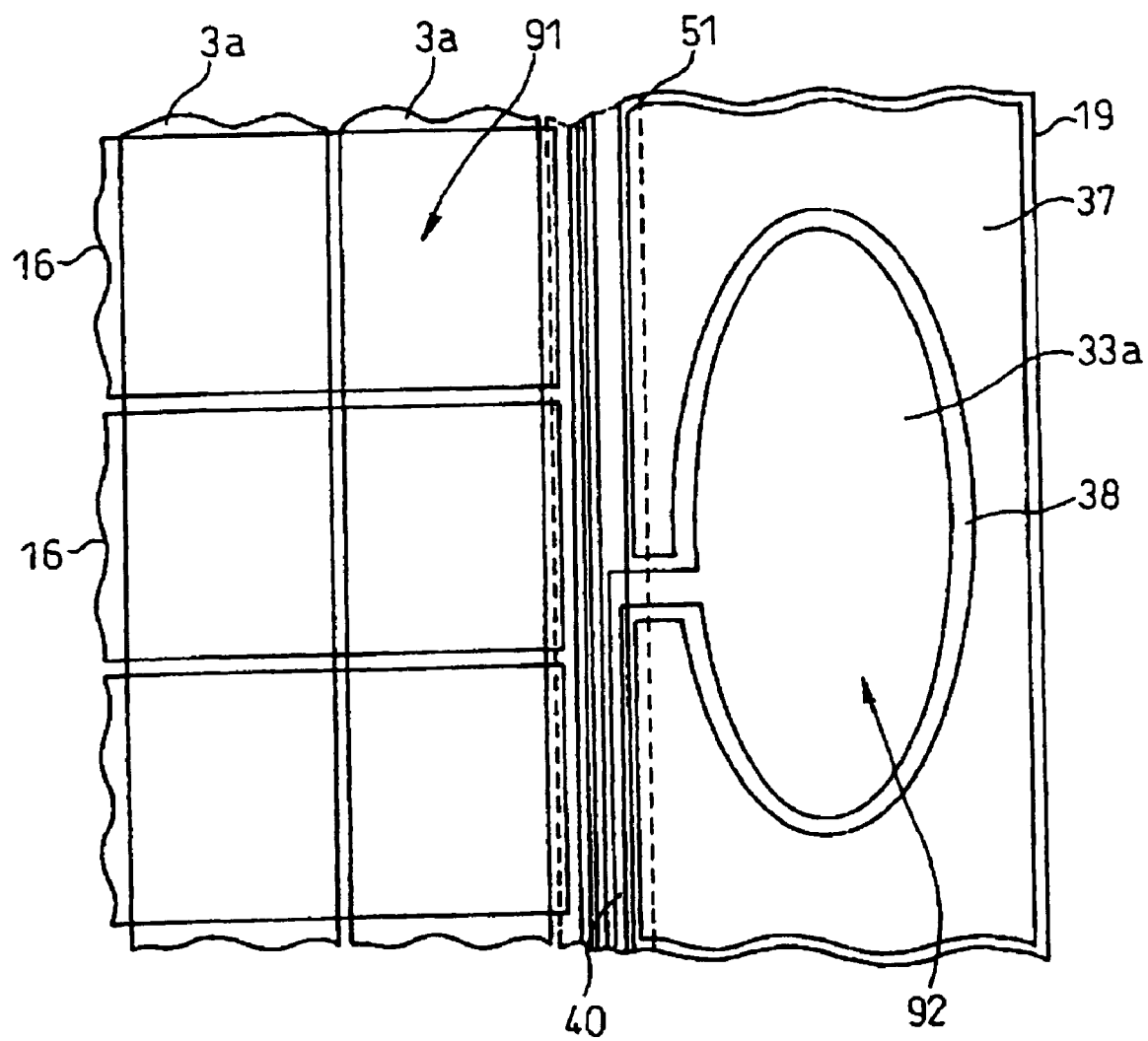
FIG. 9 is a plan view showing a part of the liquid crystal display panel in the second embodiment in enlargement.

FIG. 9 is an enlarged view of an area P3 in FIG. 8. As shown in FIG. 9, the pictogram display surrounding electrode 37 has the gap 38 to prevent electric short circuit with respect to a part near the pictogram display wiring electrode 33a and surrounds the pictogram display wiring electrode 33a in other parts. A protective element is assumed to be a ring transistor (ring diode). In the passive matrix system, although there is no damage to switching elements, a large voltage is applied to liquid crystal due to static electricity in wiring electrodes to cause deterioration and seizing of the liquid crystal. Further, since a gap between the background (surrounding electrode 37) of the pictogram display area 36 and the pictogram display pixels or the pictogram display wiring electrodes 40 and the surrounding electrode 37 are close to each other, rupture of the wiring electrode 40 tends to occur due to static electricity. Thus, it is effective to permit a current to escape using the protective element.

Figure 10A:
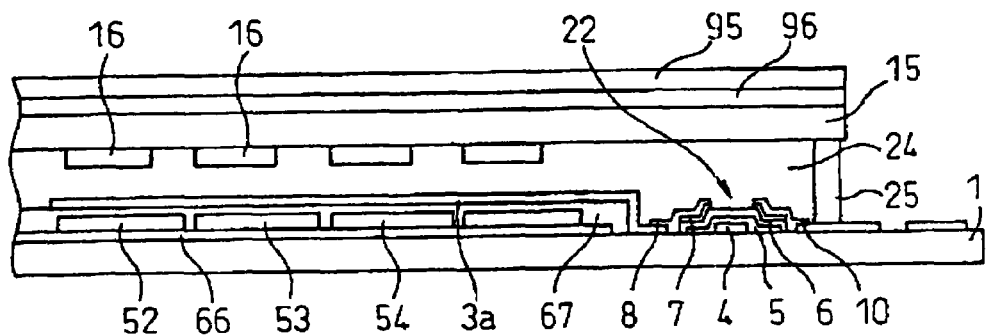
FIGS. 10A and 10B are sectional views of the liquid crystal display panel in the second embodiment.
Figure 10B:
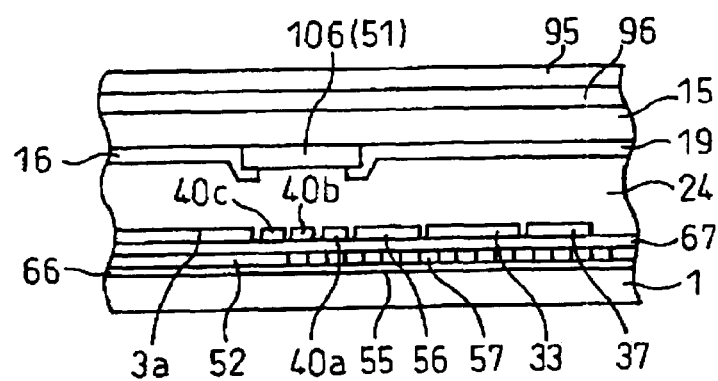

As shown in FIGS. 10A and 10B that are a sectional view on line B1-B1 and a sectional view on line B2-B2 in FIG. 8, first, a reflecting plate 66 consisting of a silver alloy film is formed on the first substrate 1. The red color filter 52, the green color filter 53, and the blue color filter 54 are provided on the first substrate 1 and the reflecting plate 66. An insulative protecting layer 67 is provided on the color filters. A wiring electrode 3a consisting of a transparent conductive film is provided on the insulative protecting layer 67. This wiring electrode 3a constitutes respective display pixels, which are arranged in a matrix shape, together with wiring electrodes 16 formed on the substrate 15 to be described later.

Moreover, the protective elements 20, 21, 22, and 23, to which the switching elements 11 consisting of thin-film transistors (TFTs) are connected in a ring shape, are provided on the first substrate 1 as in the first embodiment. Note that, although only the protective element 22 connected to the wiring electrode 3a is shown in FIG. 10A in the second embodiment, protective elements are also provided at the other end of the wiring electrode 3a, one end of the wiring electrode 16, and one ends of the pictogram display wiring electrodes 40a, 40b, and 40c as in the first embodiment.

On the second substrate 15 opposed to the first substrate 1 with a predetermined gap between the substrates, the wiring electrodes 16 consisting of a transparent conductive film are provided in a direction perpendicular to the wiring electrode 3a. The wiring electrodes 16 are connected to the protective elements provided on the first substrate 1 without the intervention of upper and lower conductive portions (not shown). This is because it is inefficient to form protective elements on both the first substrate 1 and the second substrate 15.

In the second embodiment, protective elements are provided on three sides in the outer periphery of the moving image display area 30 as in the first embodiment. Protective elements for pictogram display are also provided in the outer periphery of the pictogram display area 36. The phase difference plate 96 and the polarizing plate 95 are provided in an illustrated order on a surface opposite to the liquid crystal 24 of the second substrate 15.

In the second embodiment, a pictogram consisting of the pictogram display pixel portion 92, which is provided in a crossing portion of the pictogram display electrode 33 and the pictogram display opposed electrode 19, and the pictogram display surrounding electrode 37 provided around the pictogram are provided. The pictogram surrounding gap 38 is provided between the pictogram display electrode 33 and the pictogram display surrounding electrode 37. Further, the pictogram display wiring electrodes 40 (40a, 40b, and 40c) connected to the pictogram display electrode 33 pass through an area overlapping the partitioning line 51 from a gap connected to the pictogram surrounding gap 38 and extend to the outside of the pictogram display area 36. The partitioning line 51 of the second embodiment is constituted by resin black (obtained by dispersing a black pigment in acrylic resin) as shown in FIG. 10B.

As it is evident from the above explanation, in the pixel portions constituting the moving image display area, the protective elements are provided in the outer peripheries of the moving image display area and the pictogram display area without providing switching elements. This makes it possible to prevent damage to and deterioration of the liquid crystal, the wiring electrodes, and the surrounding electrodes in the moving image display area and the pictogram display area. More specifically, since plural pictogram display wiring electrodes are arranged in an area overlapping the partitioning line 51, a length of cutouts formed by the pictogram display wiring electrodes of the pictogram surrounding electrode is reduced, and the pictogram display wiring electrodes are not seen. Thus, improvement of display quality is expected. On the other hand, since the pictogram display wiring electrodes are arranged close to one another, it is likely that the pictogram display wiring electrodes are broken due to static electricity. However, it is possible to prevent this by providing protective elements.

Since the protective elements are provided only on the first substrate, a process of providing protective elements on the second substrate is unnecessary.

Third Embodiment

Figure 11:
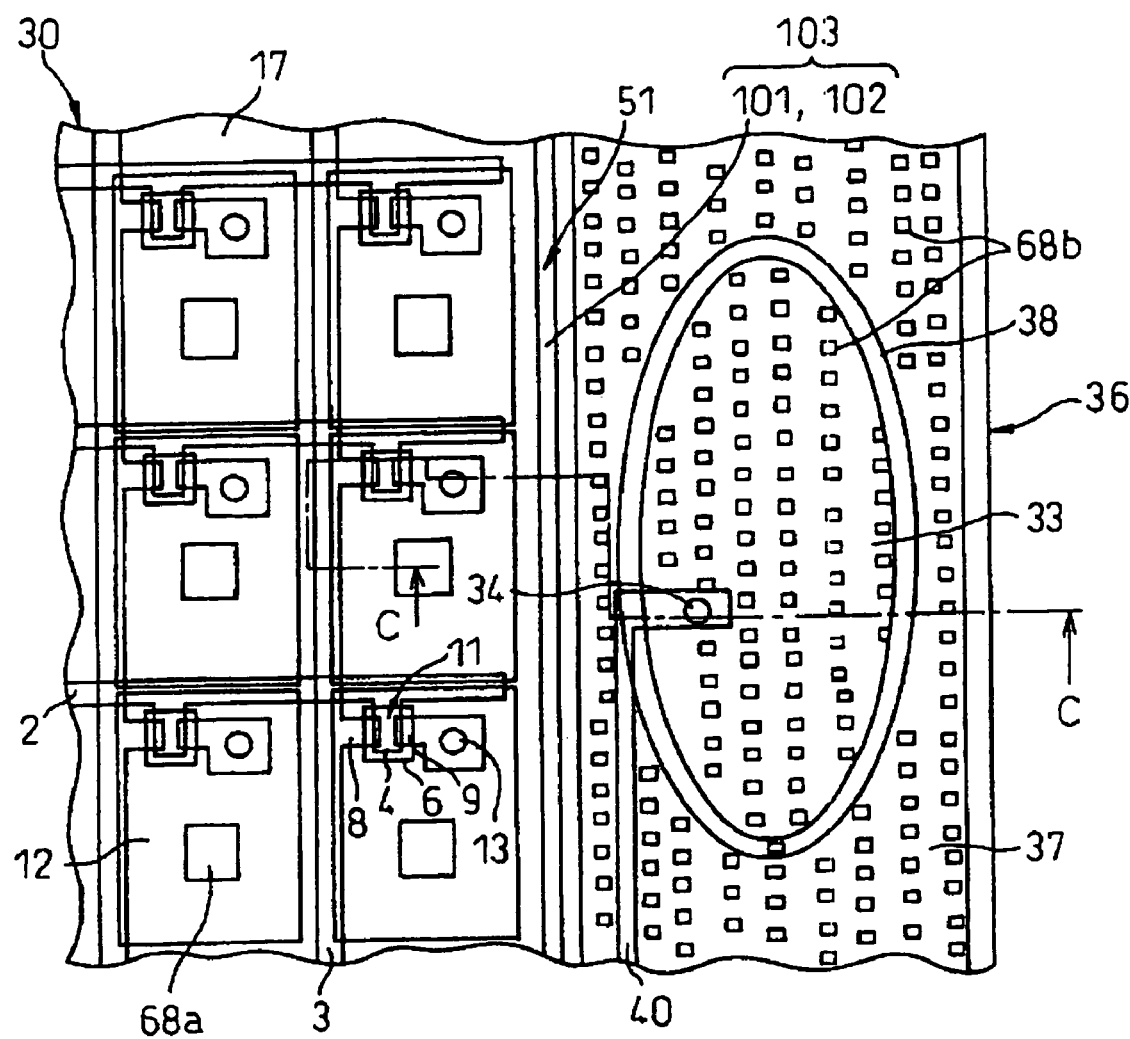
FIG. 11 is a plan view showing a part of a liquid crystal display panel in a third embodiment of the present invention.
Figure 12:
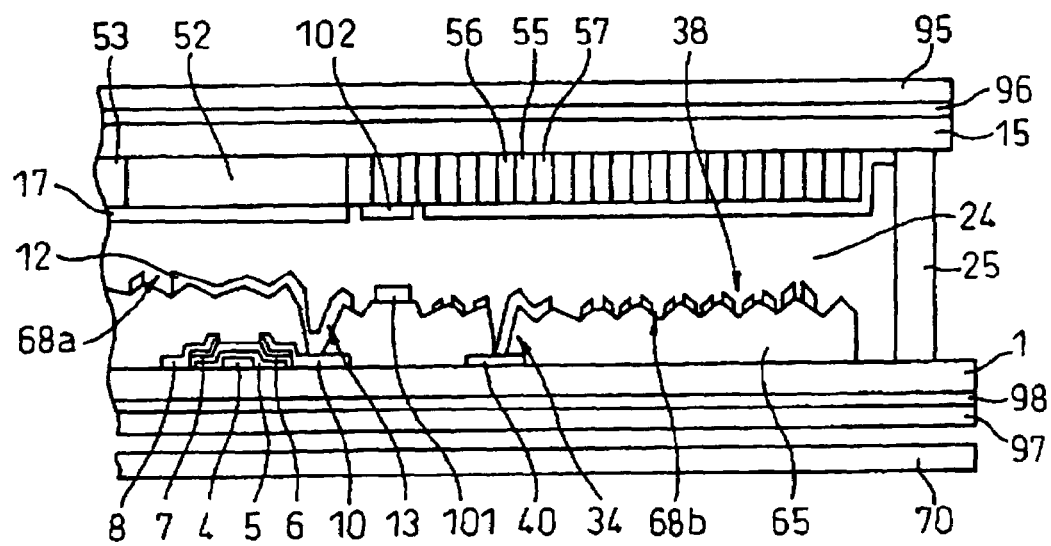
FIG. 12 is a sectional view showing the liquid crystal display panel in the third embodiment.

A liquid crystal display panel in a third embodiment of the present invention will be hereinafter explained with reference to the drawings. FIG. 11 is a plan enlarged view of the vicinity of the pictogram display electrode 33a in the third embodiment. FIG. 12 is a sectional view on line C-C in FIG. 11.

A characteristic of the third embodiment is a structure of a semi-transmission reflective liquid crystal display panel. Semi-transparency is realized by a reflective member and a transmission hole provided in the reflective member. Pixel portions of the moving image display area 30 of the active matrix system have the display electrodes 12 consisting of reflecting electrodes and display electrodes (not shown) consisting of transparent conductive films. Moving image pixel transmission holes 68a are provided in reflecting electrodes.

Pictograph pixel transmission holes 68b provided in the pictogram display area 36 are made small compared with a size of the moving image pixel transmission holes 68a, and a pitch thereof is also made small. This is for the purpose of improving reflection of a pictogram and visibility of transmission. A transparent conductive film, which performs electrical connection with pictogram display electrodes consisting of reflecting electrodes, is formed in a part of the pictogram display transmission hole 68b.

A partition pixel portion 103, which consists of a first partition wiring 101 provided on the first substrate 1 and a second partition wiring 102 provided on the second substrate 15, is provided between the moving picture display area 30 and the pictogram display area 36. An electro-optical characteristic of the liquid crystal 24 of the partition pixel portion 103 makes it possible to choose whether the moving image display area 30 and the pictogram display area 36 should be displayed in a clearly distinguished manner or only a pictogram should be displayed. Color filters in the partition pixel portion 103 are also made fine.

A second phase difference plate 98 and a second polarizing plate 97 are provided below the first substrate 1 for improvement of contrast of transmission display. In addition, a backlight 70 is provided below the second polarizing plate 97. In the case of the transmission display, when the partition pixel portion 103 is displayed brightly, this can be attained by providing transmission holes in the second partition wiring 102.

By adopting the liquid crystal display panel of the above-mentioned structure, it becomes possible to make brightness, color tone, and contrast of the moving image display area 30 and the pictogram display area 36 substantially the same. In addition, by forming the partitioning line 51 in the first and the second embodiments with the partition pixel portion 103, it becomes possible to change brightness and color tone for display of the partitioning line 51 according to displayed contents in the pictogram display area.

To make it possible to control brightness of the partition pixel portion 103 with reflection and transmission, this can be attained by forming the first partition wiring 101 with a reflecting electrode and further forming plural transmission holes.

Fourth Embodiment

Figure 13:
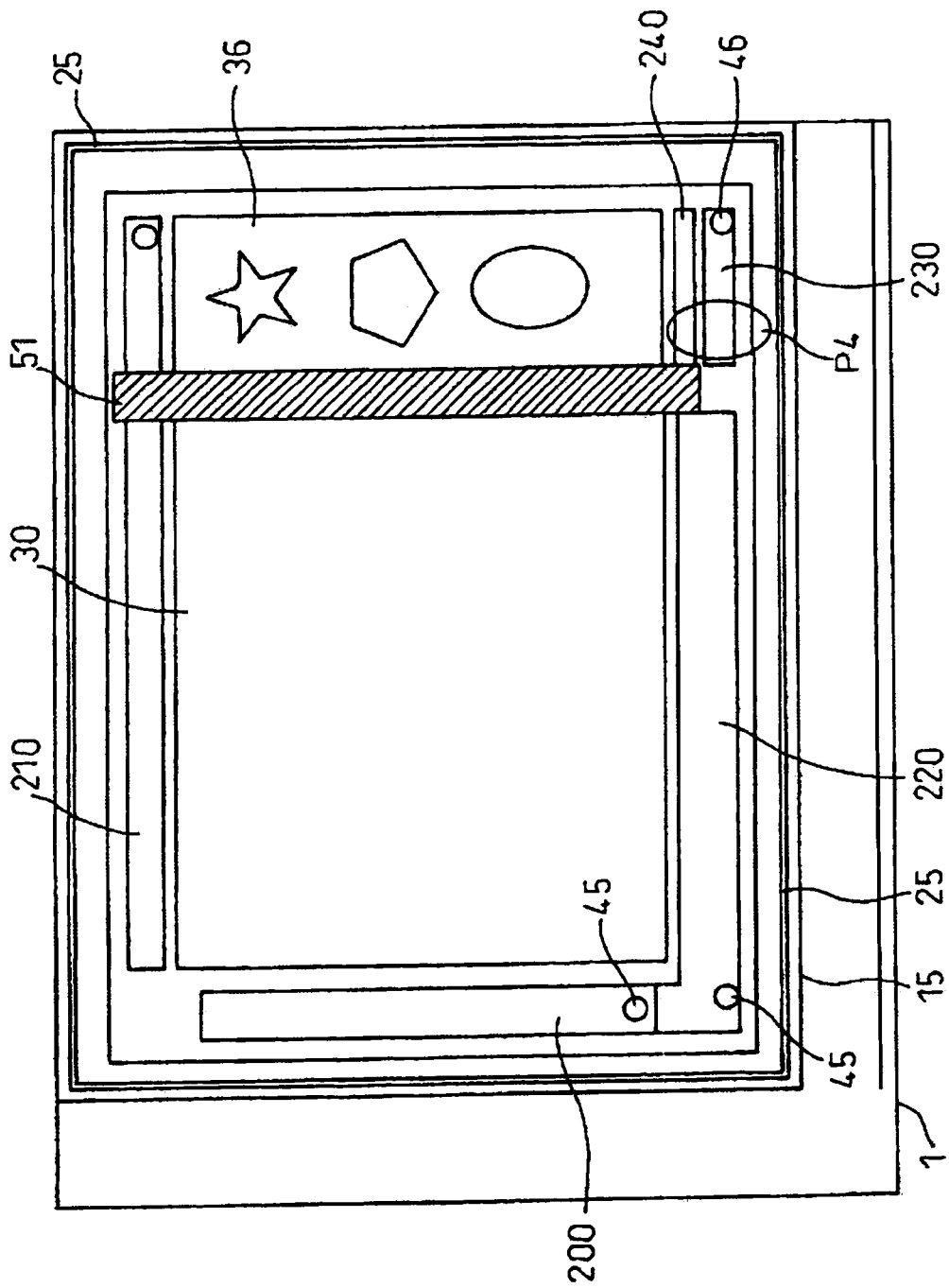
FIG. 13 is a plan schematic view showing a liquid crystal display panel in a fourth embodiment of the present invention.

A liquid crystal display panel in a fourth embodiment of the present invention will be hereinafter explained with reference to the drawings. FIG. 13 is a plan schematic view of the liquid crystal display panel in the fourth embodiment, and FIG. 14 is an enlarged view of a periphery of an area P4 shown in FIG. 13.

Figure 14:
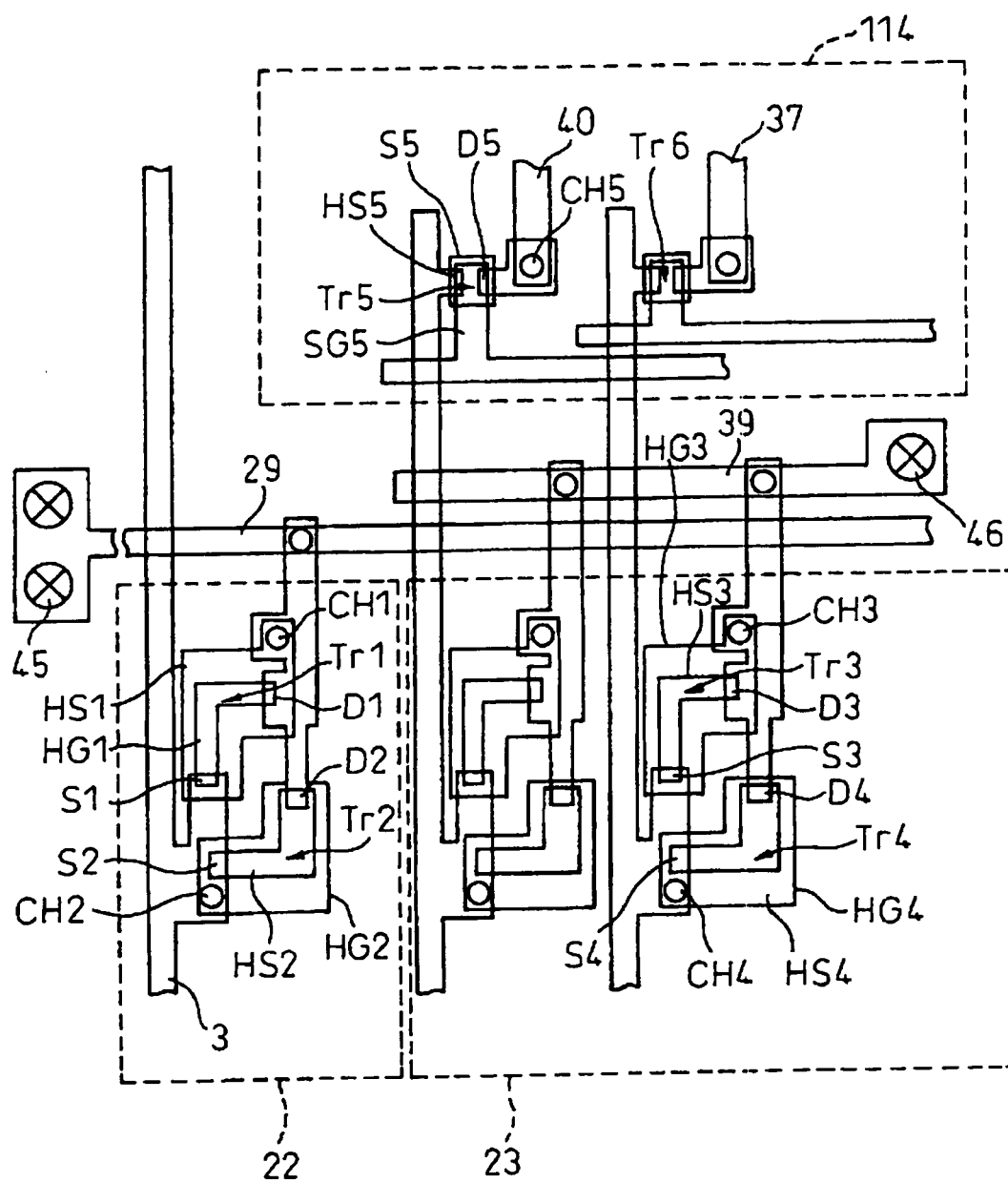
FIG. 14 is a plan view showing a periphery of protective elements of the liquid crystal display panel in the fourth embodiment of the present invention.

Characteristics of the fourth embodiment are that only the pictogram display area 36 is displayed to present a state of the liquid crystal display panel at the time when the moving image display area 30 of the liquid crystal display panel is not lit (is not driven), a switching element forming area 240 is provided in the outer periphery of the pictogram display area 36 as shown in FIG. 13 to reduce a drive frequency of the pictogram display area 36 to a low frequency, and a switching element outside display area 114 is provided in this area as shown in FIG. 14.

The switching element outside display area 114 is provided near the protective element for pictogram display 23, whereby it becomes possible to prevent breakage due to static electricity.

The switching element outside display area 114 and the protective element for pictogram display 23 are arranged inside the seal portion 25 to prevent mechanical damage from the outside and also prevent influence from the seal portion 25.

Although not shown in FIGS. 13 and 14, on the first substrate 1, as in the first embodiment, the active matrix system for providing a thin film transistor (TFT) as a switching element in each pixel portion is adopted for the moving image display area 30. Gate side protective elements for moving image display and source side protective elements for moving image display are provided in the outer peripheries 200, 210, and 220 of the moving image display area 30. The protective element for pictogram display 23 is provided on the liquid crystal side of the seal portion 25 in the outer periphery 230 of the pictogram display area 36.

The switching element outside display area 114 connected to the pictogram display wiring electrodes 40 is provided between the pictogram display area 36 and the protective element for pictogram display 23. As shown in FIG. 14, the pictogram display wiring electrodes 40 are connected to a fifth drain electrode D5 of a transistor Tr5 provided in the switching element outside display area 114. The transistor Tr5 includes a fifth gate electrode SG5 connected to an external circuit, a fifth source electrode S5 connected to an external circuit (not shown) via the protective element for pictogram display 23, and a fifth semiconductor layer HS5 consisting of an amorphous silicon (a-Si) film.

The pictogram display surrounding electrode 37 provided around a pictogram is also connected a transistor Tr6. In the forth embodiment, the protective element 22 for a moving image display area is connected to the common electrode 29 and connected to an opposed electrode via the conductive portion 45. On the other hand, the protective element 23 for a pictogram display area is connected to a common electrode 39 and connected to an opposed electrode via the conductive portion 46.

By adopting the above-mentioned structure, it becomes possible to utilize nonlinearity of the transistors Tr5 and Tr6 to retain or discharge charges stored in a capacitor of the liquid crystal 24 of the pictogram display pixel portion 92 constituting a pictogram display area or the pictogram display surrounding pixel portion, and satisfactory display can be performed even if a frequency is made variable.

Moreover, by providing the switching element outside display area 114 near the protective element for pictogram display 23, it becomes possible to substantially eliminate deterioration and damage of the switching element outside display area 114 due to static electricity.

Fifth Embodiment

Figure 15:
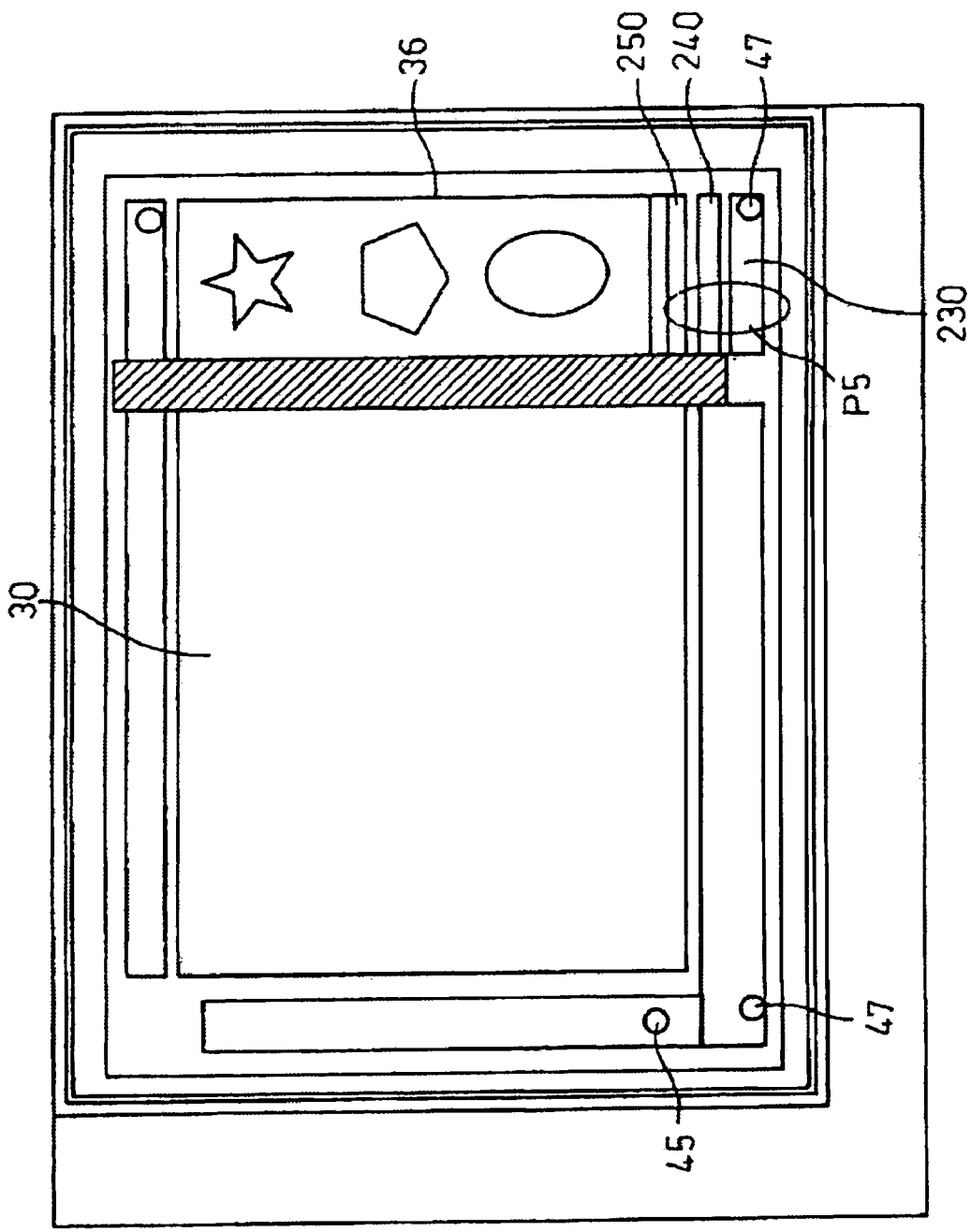
FIG. 15 is a plan schematic view showing a liquid crystal display panel in a fifth embodiment of the present invention.
Figure 16:
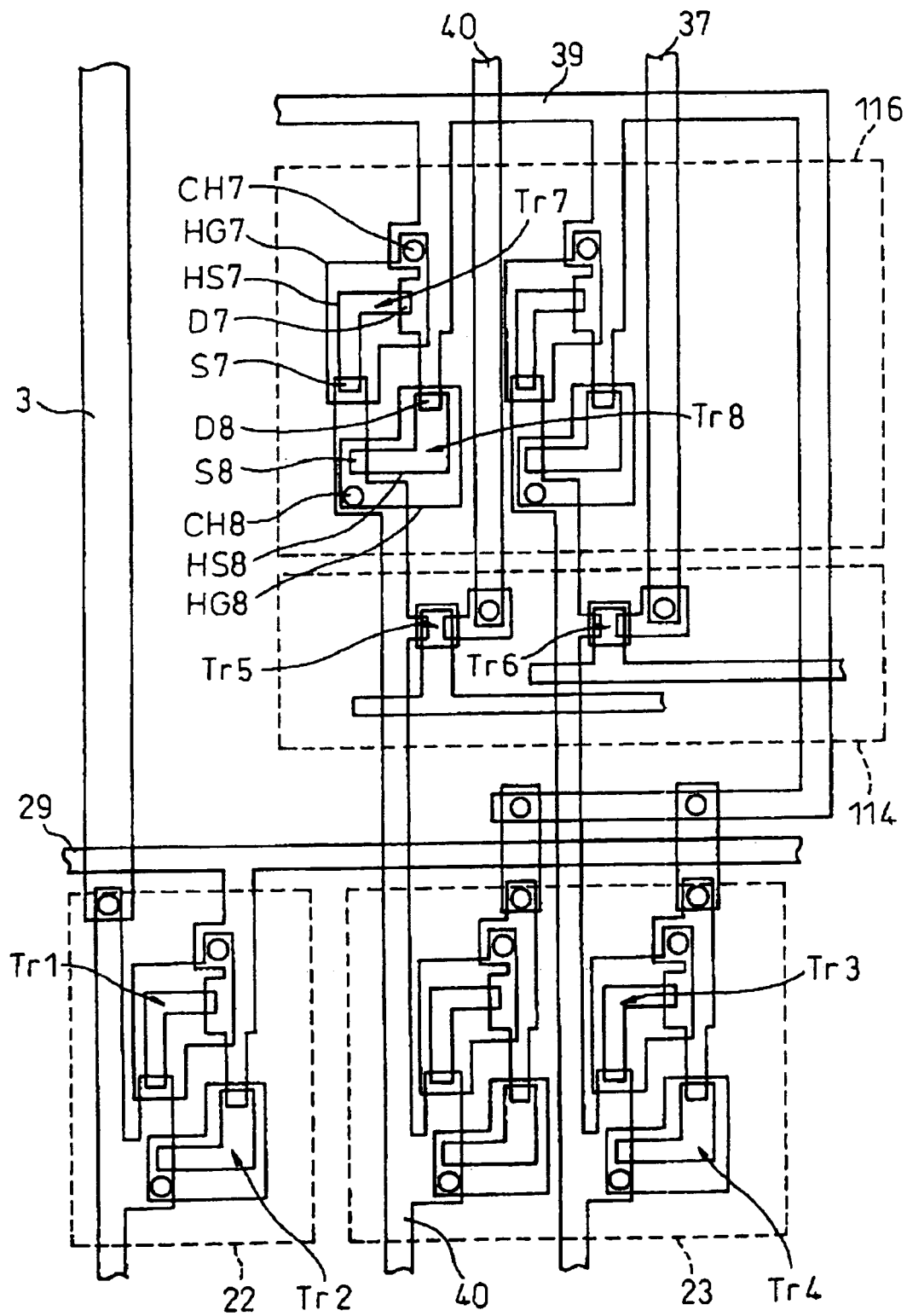
FIG. 16 is a plan view showing a periphery of protective elements of the liquid crystal display panel in the fifth embodiment of the present invention.

A liquid crystal display panel in a fifth embodiment of the present invention will be hereinafter explained with reference to the drawings. FIG. 15 is a plan schematic view of the liquid crystal display panel in the fifth embodiment, and FIG. 16 is a plan view showing the part of P5 in FIG. 15.

Characteristics of the fifth embodiment are that, as in the fourth embodiment, only the pictogram display area 36 is displayed to present a state of the liquid crystal display panel at the time when the moving image display area 30 of the liquid crystal panel is not-lit-(not driven), and the switching element outside display area 114 is provided in the outer periphery 240 of the pictogram display area 36 to reduce a drive frequency of the pictogram display area 36 to a low frequency.

In addition, the fifth embodiment is characterized in that an area 250 is further provided outside the pictogram display area on the pictogram display area side with respect to the switching element outside display area 114, and an inner protective element for pictogram display 116 is provided in this area. In other words, in the fifth embodiment, protective elements are provided in two portions with respect to the pictogram display area 36. Note that, since the inner protective element for pictogram display 116 is provided outside the pictogram display area 36, the inner protective element for pictogram display 116 does not affect display. However, an area for providing the protective element 116 is required anew, an area of the pictogram display area 36 is reduced by a quantity of the new area. Therefore, when a large area is required for the pictogram display area, it is possible that the protective element 116 is provided inside the pictogram display area.

Static electricity from the pictogram display area 36 flows a current to the switching element outside display area 114 with the inner protective element for pictogram display 116 to perform reduction in a voltage, and static electricity from the outside flows a current with the protective element for pictogram display 23 to perform reduction in a voltage.

The switching element outside display area 114, the protective element for pictogram display 23, and the inner protective element for pictogram display 116 are arranged inside a seal portion to prevent mechanical damage from the outside and also prevent influence from the seal portion.

As shown in FIG. 16, the inner protective element for pictogram display 116 is a protective element that is formed substantially the same as the protective element for pictogram display 23 and formed as a ring diode by a transistor Tr7 and a transistor Tr8. The identical pictogram display common electrode 39 is adopted for the protective element for pictogram display 23 and the inner protective element for pictogram display 116.

Sixth Embodiment

Figure 17:
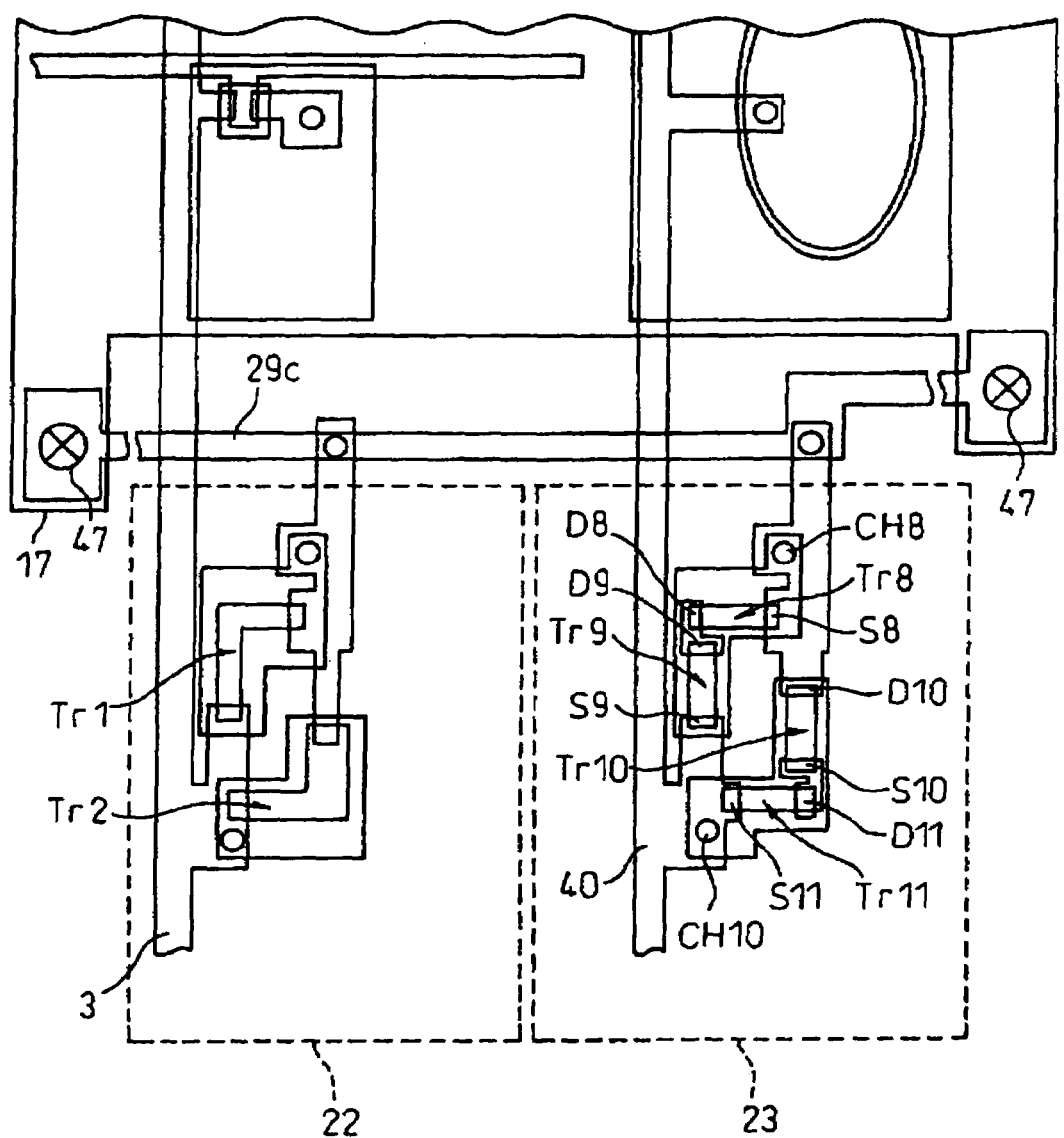
FIG. 17 is a plan view showing a periphery of protective elements of a liquid crystal display panel in a sixth embodiment of the present invention.
Figure 18:
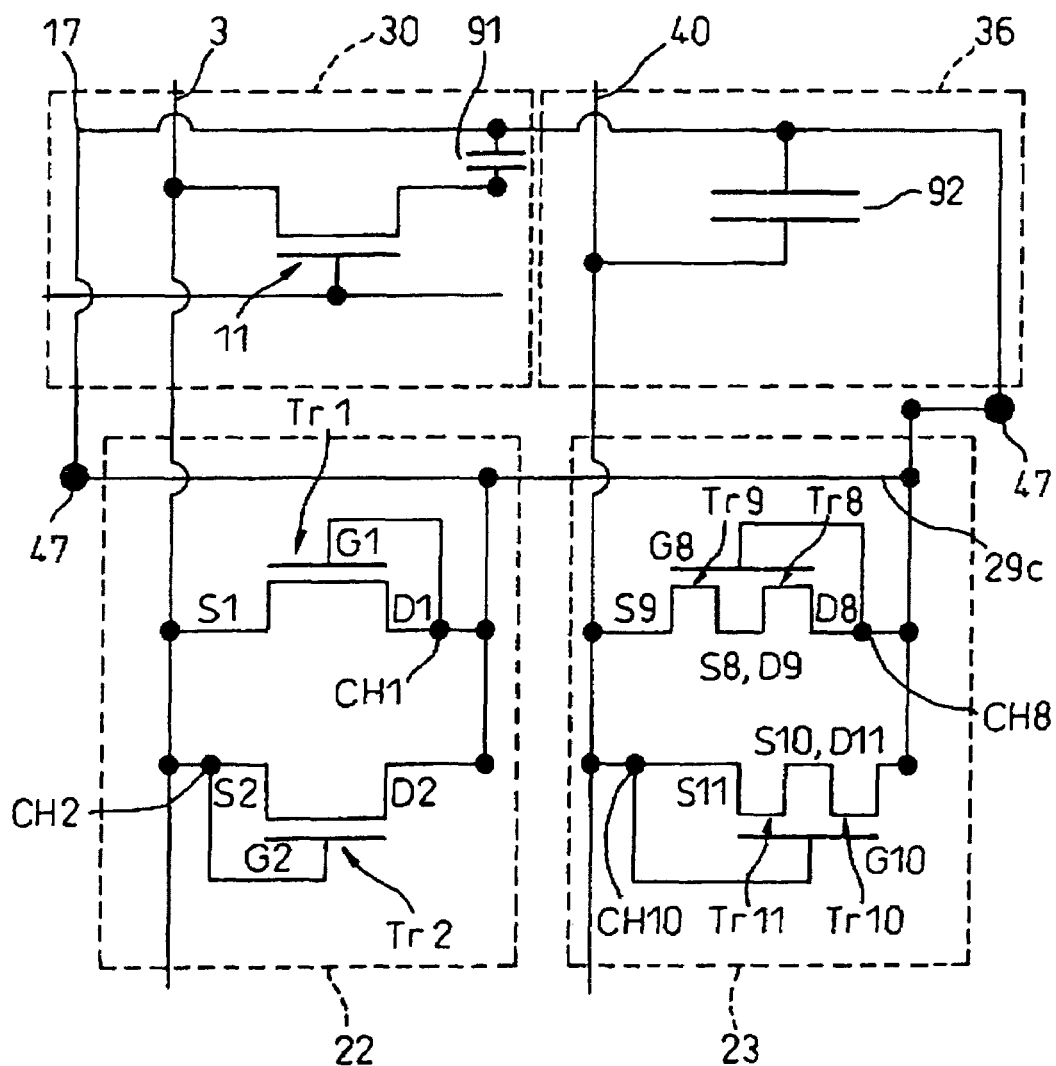
FIG. 18 is an equivalent circuit diagram showing the periphery of the protective elements of the liquid crystal display panel in the sixth embodiment of the present invention.

A liquid crystal display panel in a sixth embodiment of the present invention will be hereinafter explained with reference to the drawings. FIG. 17 is a plan enlarged view of the part of a protective element for pictogram display in the liquid crystal display panel according to the sixth embodiment, and FIG. 18 is an equivalent circuit diagram of FIG. 17.

A characteristic of the sixth embodiment is that two transistors Tr8 and Tr9 are connected in series in the protective element for pictogram display 23 and commonly used in a gate electrode G8. Transistors Tr10 and Tr11 are also connected in series and commonly used in a gate electrode G10. The transistors, two of which are connected in series, respectively, are connected in a ring shape. FIG. 18 shows an equivalent circuit.

By connecting the two transistors Tr in series, for example, even if one transistor Tr8 is short-circuited, since the other transistor Tr9 remains, pictogram display pixel portions or pictogram display wiring electrodes are protected. Although it is possible that further plural transistors Tr are connected in series, since there are a reduction in an amount of current that can be flown at an instance and an increase in an area occupied by elements, it is preferable to connect two transistors in series and further connect the transistors in a ring shape.

As it is evident form the above explanation, a protective element is constituted by the total four transistors Tr, in which transistor sets of two transistors Tr connected in series are connected in a ring shape, between the pictogram display wiring electrodes and the common electrode. Thus, even if one of the transistors Tr is damaged by static electricity, no problem occurs in display. Therefore, in a pictogram having a large display area, since a current amount due to static electricity is large, adoption of the structure of the sixth embodiment acts particularly effectively.

Seventh Embodiment

Figure 19:
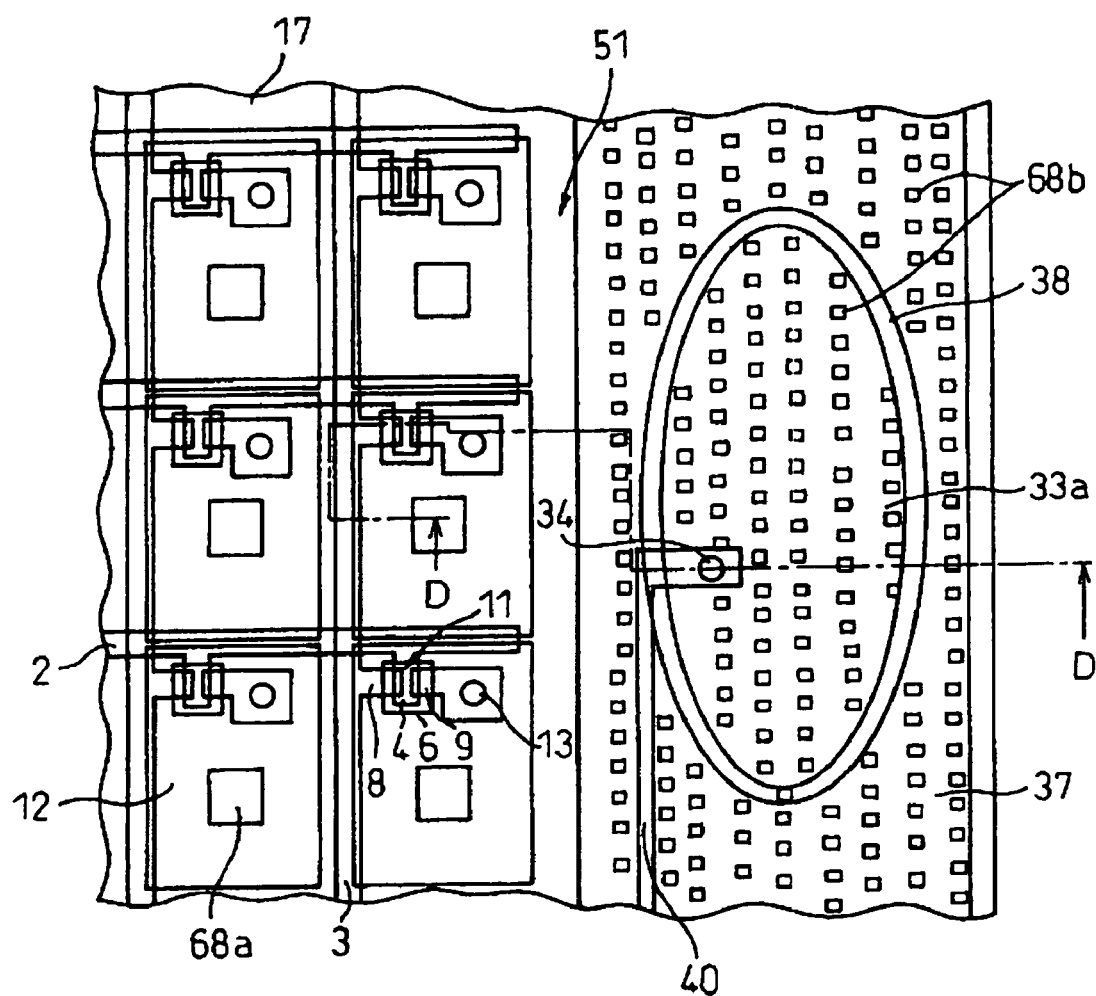
FIG. 19 is a plan view showing a part of a liquid crystal display panel in a seventh embodiment of the present invention in enlargement.
Figure 20:
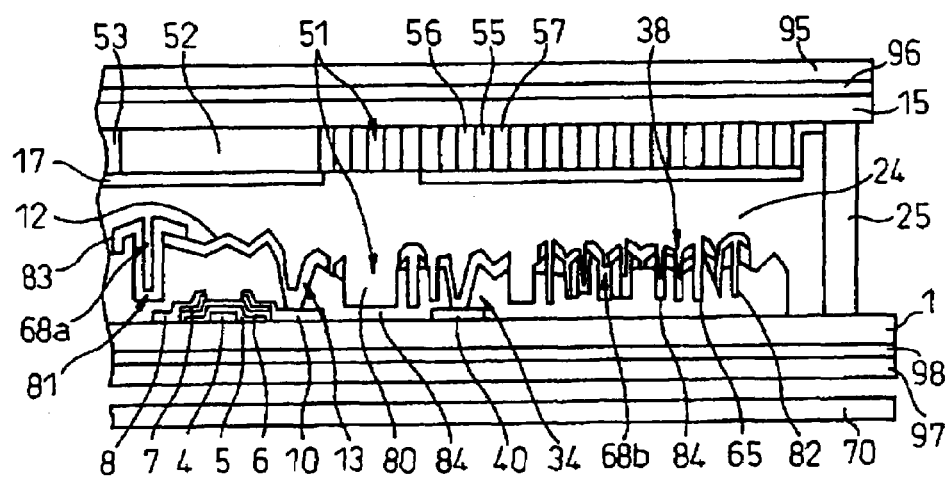
FIG. 20 is a sectional view showing the liquid crystal display panel in the seventh embodiment of the present invention.

A liquid crystal display panel in a seventh embodiment of the present invention will be hereinafter explained with reference to the drawings. A characteristic of the seventh embodiment is that a reflectance is reduced without providing a reflecting electrode and an opposed electrode in the part of the partitioning line 51. In the case of transmission display, since emitted light from a backlight is attenuated only by color filters, a partitioning line can be displayed brightly and clearly. FIG. 19 is a plan enlarged view of the vicinity of the pictogram display electrode 33a in the liquid crystal display panel according to the seventh embodiment. FIG. 20 is a sectional view on line D-D shown in FIG. 19.

The seventh embodiment adopts a semi-transmission reflective liquid crystal display panel as in the third embodiment. Structures of the switching element 11, the uneven organic film 65, and the semi-transmission reflecting plate on the first substrate 1 are the same. In the moving image pixel transmission hole 68a provided in the display electrode 12, a moving image pixel transmission moat 81 is formed in the uneven organic film 65, and a moving image pixel transmission conductive film 83 is formed on the moving image pixel transmission moat 81. In addition, in the pictogram pixel transmission hole 68b provided in the pictogram display electrode 33a, a pictogram pixel transmission moat 82 is formed in the uneven organic film 65, and a pictogram pixel transmission conductive film 84 is formed on the pictogram pixel transmission moat 82.

In the area of the partitioning line 51, the uneven organic film 65 and a moat for partitioning line 80 are provided on the first substrate 1. Thus, a reflectance in the area can be made lower than that of the other areas. Color filters are provided on the second substrate 15 for a reduction in transmittance, but an opposed electrode consisting of a transparent conductive film is removed for the purpose of reducing a reflectance. The liquid crystal 24 uses normally white display in which the liquid crystal 24 changes to a bright state when an applied voltage is small and changes to a dark state when an applied voltage is large.

By adopting the above-mentioned structure, the partitioning line 51 changes to be displayed darker than the other parts in the case of reflection and becomes recognizable as display brighter than the other parts in the case of transmission. A semi-transmission reflecting plate is used in the seventh embodiment. However, the reflecting electrode is removed to form the display electrode 12 or the pictogram display electrode 33 only with a transparent conductive film and planarize the uneven organic film 65, whereby the present invention becomes applicable to the transmission type liquid crystal display panel.

Eighth Embodiment

Figure 21:
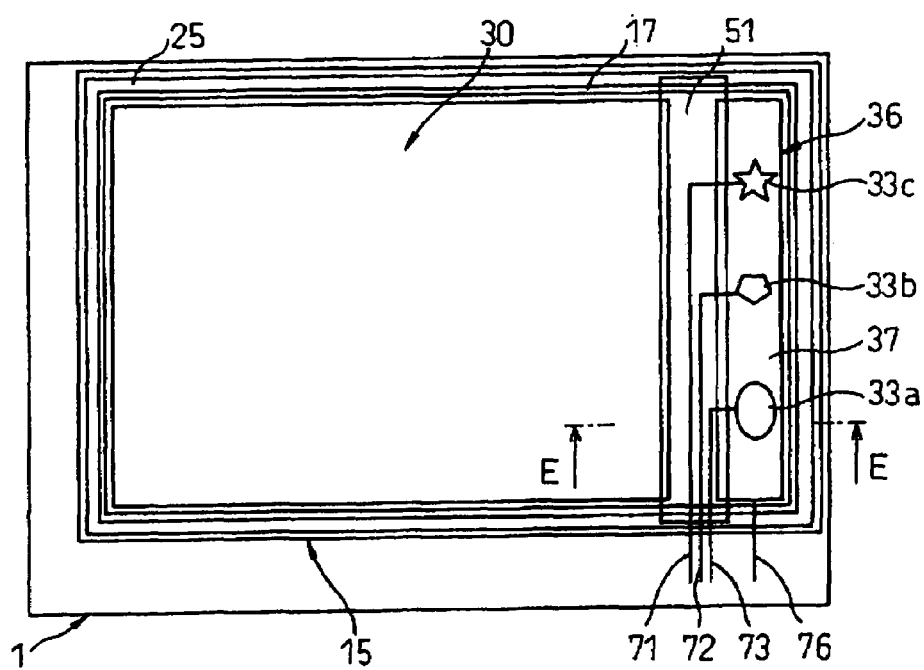
FIG. 21 is a plan schematic view showing a liquid crystal display panel in an eighth embodiment of the present invention.

A liquid crystal display panel in an eighth embodiment of the present invention will be hereinafter explained with reference to the drawings. Characteristics of the eighth embodiment are that the partitioning line 51 adopts a structure for stacking color filters of different colors to reduce a reflectance, pictogram display wiring electrodes are formed in an area overlapping a partitioning line, and plural pictogram display wiring electrodes provided in the area overlapping the partitioning line are formed to be parallel to one another. FIG. 21 is a plan schematic view of the liquid crystal display panel in the eighth embodiment, and FIG. 22 is a sectional view on line E-E shown in FIG. 21.

As in the first embodiment, in the eighth embodiment, the moving image display area 30 and the pictogram display area 36 are provided, and a switching element consisting of a thin-film transistor TFT is arranged in each pixel portion constituting the moving image display area 30. The pictogram display area 36 has the pictogram display electrode 33 and the pictogram display surrounding electrode 37, which is provided with the pictogram surrounding gap 38 between the pictogram display electrode 33 and the pictogram display surrounding electrode 37, around the pictogram display electrode 33. The opposed electrode 17 consisting of a transparent conductive film is provided on the second substrate 15.

Figure 22:
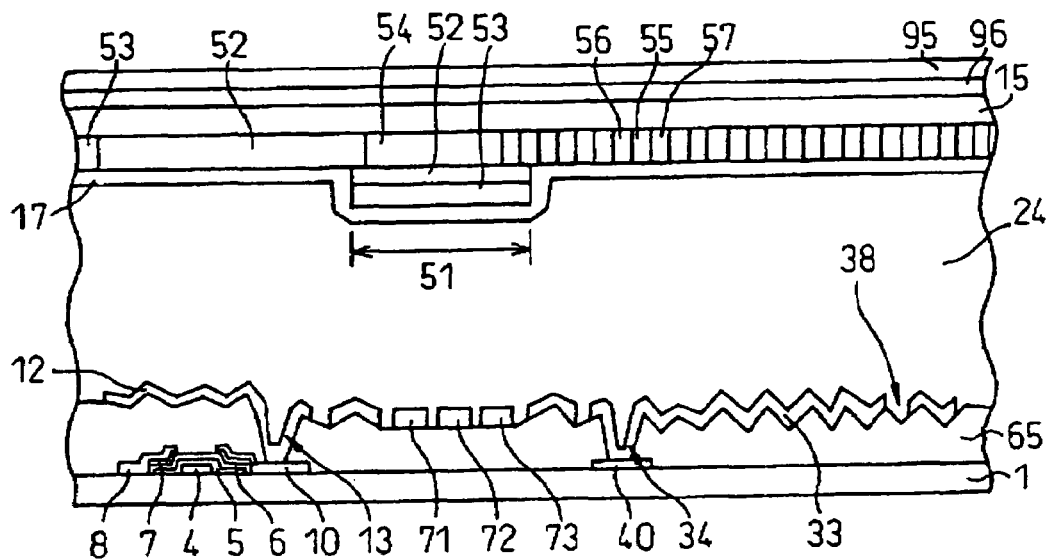
FIG. 22 is a sectional view showing the liquid crystal display panel in the eighth embodiment of the present invention.

As shown in FIG. 22, in the area of the partitioning line 51, three layers consisting of the red color filter 52, the green color filter 53, and the blue color filter 54 are stacked. Consequently, unlike the other areas, a transmittance can be extremely reduced.

On the first substrate 1 overlapping the partitioning line 51, the surface of the uneven organic film 65 is planarized to prevent rupture of the pictogram display wiring electrodes. Three pictogram display wiring electrodes 71, 72, and 73 are arranged substantially parallel to one another as shown in FIG. 21. Therefore, the pictogram display wiring electrodes can be shielded by the partitioning line 51. In addition, the partitioning line 51 partly overlaps the moving image display area 30 and the pictogram display area 36. Note that reference numeral 76 denotes a wiring electrode of the surrounding electrode 37.

By adopting the above-mentioned structure, the partitioning line 51 can secure a satisfactory light-shielding property without specifically increasing a process. In addition, the plural pictogram display wiring electrodes are arranged substantially parallel to one another in the area overlapping the partitioning line 51, whereby these wiring electrodes are not recognized from the outside, and display quality can be improved.

Ninth Embodiment

Figure 23:
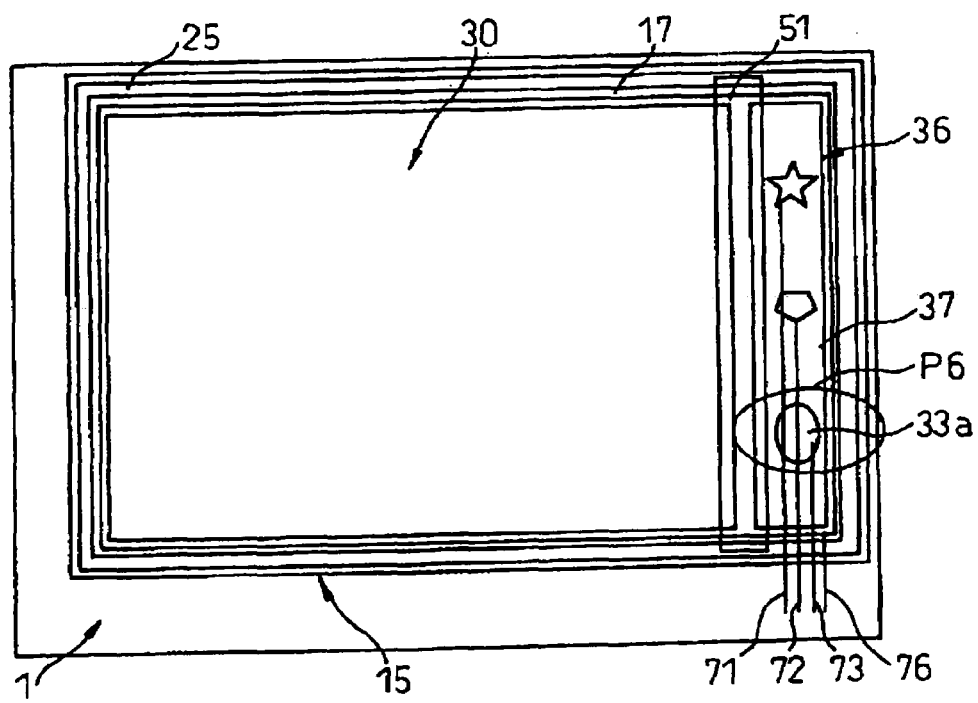
FIG. 23 is a plan schematic view showing a liquid crystal display panel in a ninth embodiment of the present invention.
Figure 24:
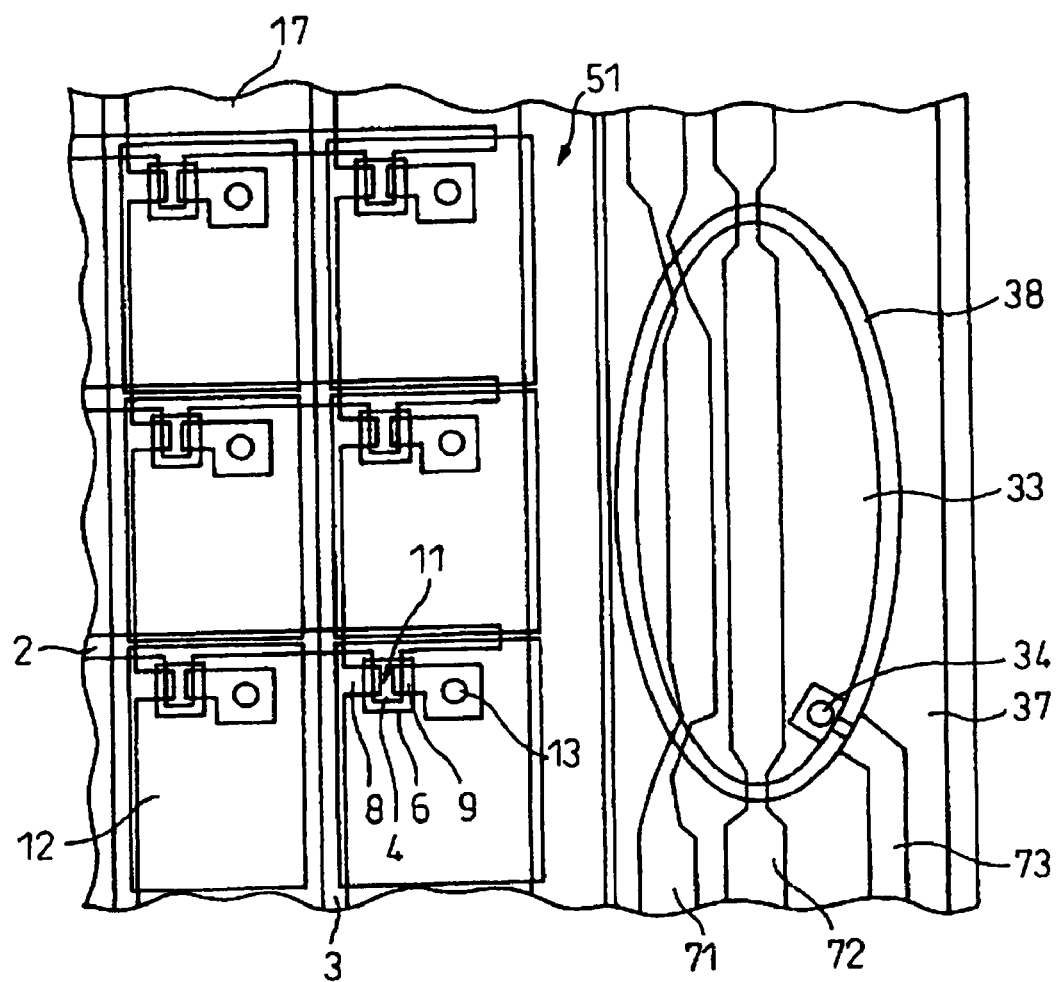
FIG. 24 is a plan view showing a part of the liquid crystal display panel in the ninth embodiment of the present invention in enlargement.

A liquid crystal display panel in a ninth embodiment of the present invention will be hereinafter explained with reference to the drawings. A characteristic of the ninth embodiment is that, to thin the partitioning line 51, pictogram display wiring electrodes for other pictograms are arranged below a pictogram in a pictogram display area. FIG. 23 is a plan schematic view of the liquid crystal display panel in the ninth embodiment. FIG. 24 is an enlarged plan view of the part of P6 shown in FIG. 23.

As in the first embodiment, in the ninth embodiment, the moving image display area 30 and the pictogram display area 36 are provided, and a switching element consisting of a thin-film transistor TFT is arranged in each pixel portion constituting the moving image display area 30. The pictogram display area 36 has the pictogram display electrode 33 and the pictogram display surrounding electrode 37, which is provided with the pictogram surrounding gap 38 between the pictogram display electrode 33 and the pictogram display surrounding electrode 37, around the pictogram display electrode 33. The opposed electrode 17 consisting of a transparent conductive film is provided on the second substrate 15.

As shown in FIG. 23, the partitioning line 51 partly overlaps the moving image display area 30 and the pictogram display area 36. To reduce areas of the pictogram display area 36 and the partitioning line 51, pictogram display wiring electrodes, which are connected to the pictogram display electrode 33 and extend to the outside of the pictogram display area 36, are provided in a layer below the pictogram display electrode 33 via an insulating film. However, since the pictogram display wiring electrodes 71, 72, and 73 are prevented from being seen in the pictogram surrounding gap 38 provided between the pictogram display electrode 33 and the pictogram display surrounding electrode 37, these wiring electrode portions corresponding to the gap portion are narrowed to be thin.

Since the pictogram display electrode 33 and the pictogram display surrounding electrode 37 are reflecting electrodes, the pictogram display electrode 33 and the pictogram display surrounding electrode 37 block the pictogram display wiring electrodes 71, 72, and 73 provided in the layer below and never disturb display. Therefore, as shown in FIG. 23, a reduction in an area of an excess portion of the pictogram display area 36 can be reduced. Further, even if the surface of the partitioning line 51 is reduced in size, display with satisfactory visibility can be performed.

Tenth Embodiment

Figure 25:
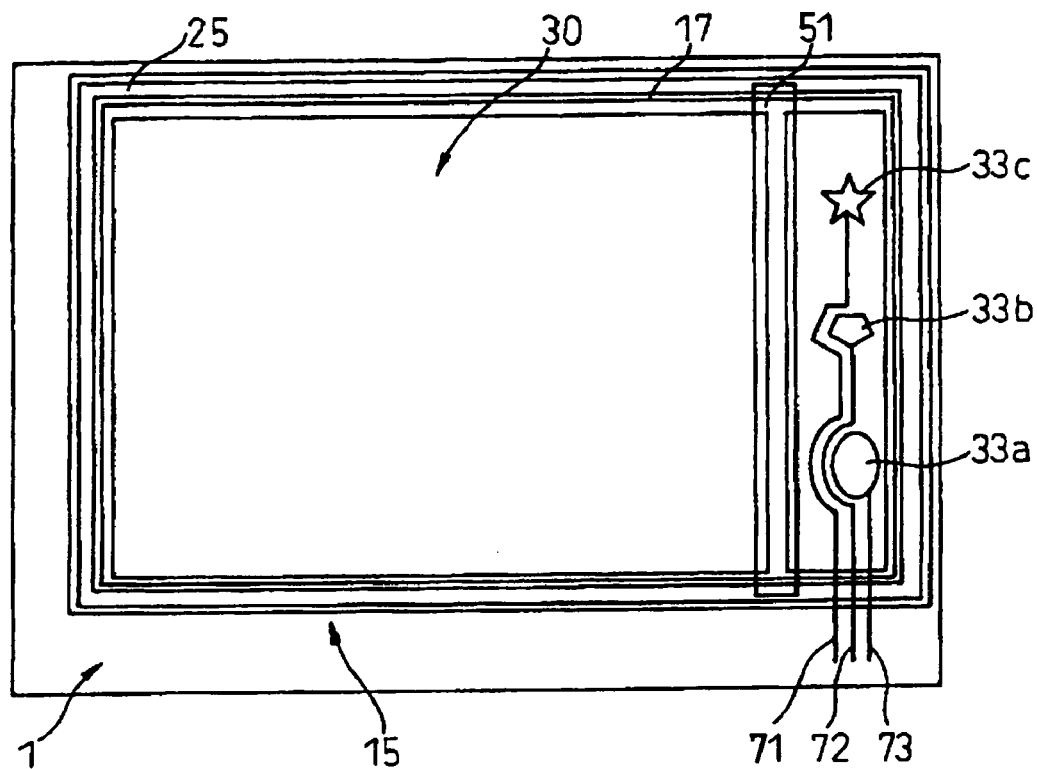
FIG. 25 is a plan schematic view showing a liquid crystal display panel in a tenth embodiment of the present invention.

A liquid crystal display panel in a tenth embodiment of the present invention will be hereinafter explained with reference to the drawings. A characteristic of the tenth embodiment is that a structure in which a partitioning line is thinned and the pictogram display electrode 33 is directly provided on the first substrate 1 is adopted. FIG. 25 is a plan schematic view of the liquid crystal display panel in the tenth embodiment. As shown in the figure, in the tenth embodiment, to simplify the structure of the pictogram display area 36 as much as possible, the pictogram display electrode 33 is directly provided on the first substrate 1. In addition, to use the pictogram display electrode 33 for transmission display, the pictogram display electrode 33 is formed of a transparent conductive film. Therefore, a member blocking light or a conductive member cannot be arranged in a layer below the pictogram display electrode 33.

The tenth embodiment adopts a structure in which the pictogram display wiring electrodes 71, 72, and 73, which are connected to the pictogram display electrode 33 and provided to extend to the outer periphery of the pictogram display area 36, are bypassed around each pictogram. The pictogram display electrode 33 and the pictogram display wiring electrodes 71, 72, and 73 are formed of a transparent conductive film and are formed as one body.

As shown in FIG. 25, the pictogram display wiring electrode 71 bypasses the pentagonal pictogram display electrode 33b and the elliptical pictogram display electrode 33a. The pictogram display wiring electrode 72 bypasses the elliptical pictogram display electrode 33a. In the tenth embodiment, the pictogram display wiring electrodes 71 and 72 are arranged in an identical direction with respect to the elliptical pictogram display electrode 33a. However, when the wiring electrodes bypass plural pictogram display electrodes, it is particularly effective to allocate the same number on the left and right of the pictogram display electrode 33a because the pictogram display electrodes are located in the center with respect to the pictogram display wiring electrodes.

By adopting the above-mentioned structure, pictogram display with a satisfactory display quality becomes possible in a pictogram display area of a transmission liquid crystal display panel as well.

Eleventh Embodiment

Figure 27:
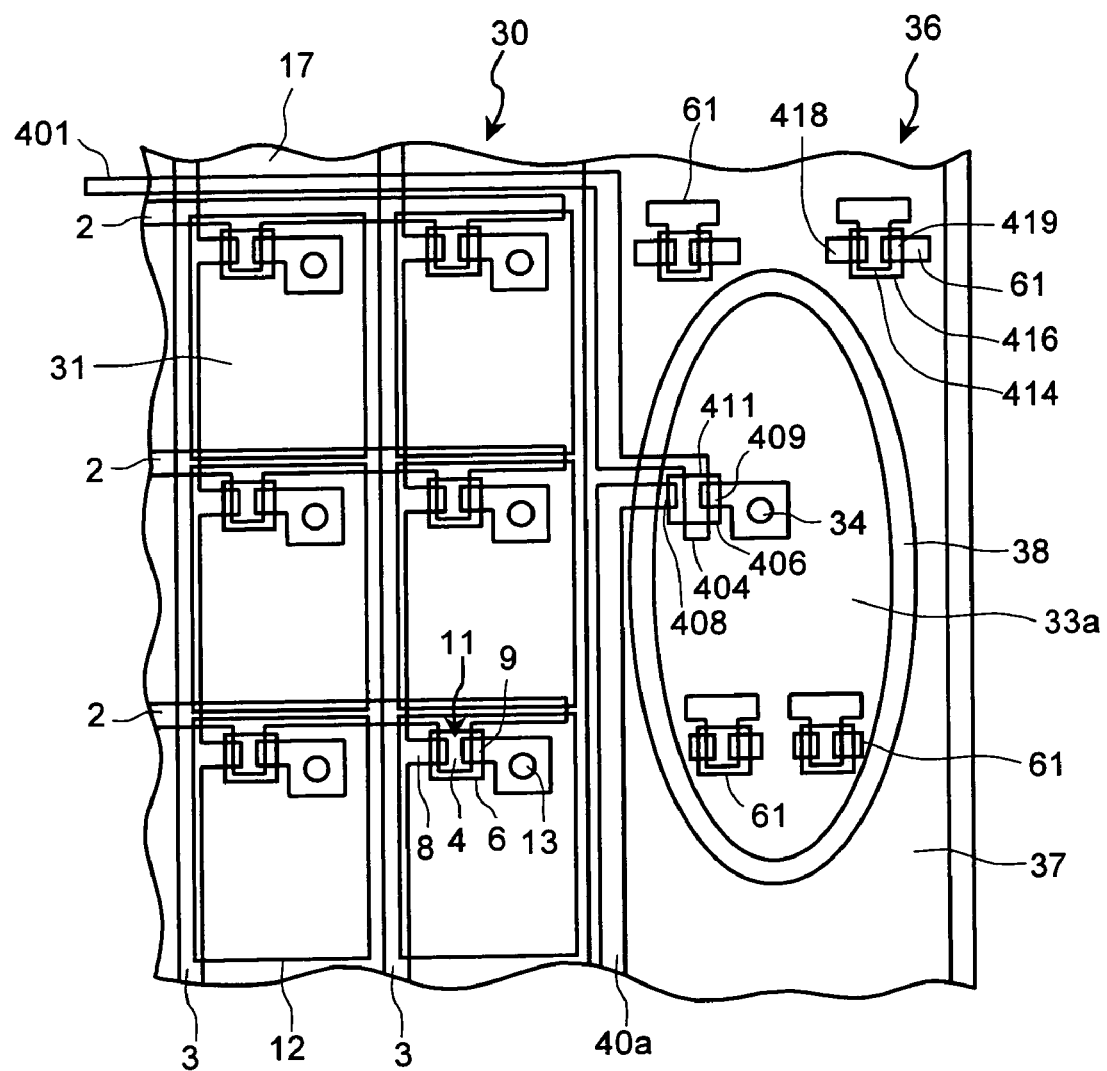
FIG. 27 is a plan view showing a part of a liquid crystal display panel in an eleventh embodiment of the present invention in enlargement.

A liquid crystal display panel in an eleventh embodiment of the present invention will be hereinafter explained with reference to the drawings. FIG. 27 is a plan enlarged view of the vicinity of the pictogram display electrode 33a in the eleventh embodiment. Note that, although the elliptical pictogram display electrode 33a will be explained for convenience of explanation, the same holds true for other pictograms.

Characteristics of the eleventh embodiment are that a switching element (hereinafter, "pictogram switching element") 411 consisting of, for example, a thin-film transistor (TFT) is provided in a pixel portion consisting of the pictogram display electrode 33a in the pictogram display area 36, and plural protrusions 61 serving as dummy switching elements are provided in the pictogram display area 36. These protrusions 61 are provided to ease non-uniformity of a thickness of a liquid crystal layer in the moving image display area 30 and a thickness of a liquid crystal layer in the pictogram display area 36.

One first switching element 11 is provided in each pixel portion 31 in the moving image display area 30. In other words, a large number of first switching elements 11 are arranged in the moving image display area 30. On the other hand, in the pictogram display area 36, the pictogram switching elements 411 are present in a number equivalent to the number of pictograms, for example, three in the example shown in FIG. 1. The pictogram switching elements 411 are present extremely sparsely compared with the distribution of the first switching elements 11 in the moving image display area 30.

These switching elements 11 and 411 are formed by, for example, stacking a semiconductor film, an insulating film, a metal film, and the like on the first substrate 1. Thus, if the protrusions 61 are not arranged in the pictogram display area 36, the unevenness state of the first substrate 1 is different in the moving image display area 30 and the pictogram display area 36. Then, when the first substrate 1 and the second substrate 15 are opposed to each other via a spacer and liquid crystal is encapsulated between the first substrate 1 and the second substrate 15, the thickness of the liquid crystal layer in the pictogram display area 36 is smaller, that is, thinner than the thickness of the liquid crystal layer in the moving image display area 30. It is not preferable if the thicknesses of the liquid crystal layers are non-uniform in this way because a uniform display quality is not obtained in the moving image display area 30 and the pictogram display area 36.

In other words, to obtain a uniform display quality, the unevenness state of the first substrate 1 only has to be the same or substantially the same in the moving image display area 30 and the pictogram display area 36. For this purpose, the dummy switching elements (protrusions 61) simulating the first switching elements 11 in the moving image display area 30 only have to be arranged in the same manner as the distribution of the first switching elements 11 in the moving image display area 30.

In light of such a viewpoint, it is preferable that a height of the protrusions 61 is the same as a height of the first switching elements 11 in the moving image display area 30. However, if the height of the protrusions 61 is a half or more of the height of the first switching elements 11, display quality, which is uniform to a degree not causing a practical problem, is obtained in the moving display area 30 and the pictogram display area 36. Thus, the height of the protrusions 61 may be a half or more of the height of the first switching elements 11.

Even if the height of the protrusions 61 is slightly larger than the height of the first switching elements 11, this does not cause a problem in display quality. However, this is not preferable when the protrusions 61 are formed together with the first switching elements 11 because an increase in the number of processes and complication of the processes are caused. For example, the semiconductor film, the insulating film, the metal film, and the like should be formed thicker than the first switching elements 11, and a process for stacking the semiconductor film, the insulating film, the metal film, and the like is required in addition to a manufacturing process for the first switching elements 11.

Therefore, it is advisable that the height of the protrusions 61 is a half or more of the height of the first switching elements 11 and equal to or less than the same height as the first switching elements 11 and is preferably the same height as the first switching elements 11. In addition, it is preferable that an area of the protrusions 61 is substantially the same as an area of the first switching elements 11 in the moving image display area 30. Further, it is preferable that a distribution of the protrusions 61 in the pictogram display area 36 is substantially the same as a distribution of the first switching elements 11 in the moving image display area 30. In other words, it is preferable that the protrusions 61 with substantially the same size as the first switching elements 11 are arranged in the pictogram display area 36 at substantially the same pitch as the first switching elements 11 in the moving image display area 30.

However, display quality is higher when the protrusions 61 are arranged avoiding the pictogram surrounding gap 38 as shown in FIG. 27. Thus, when the protrusions 61 cannot be arranged at substantially the same pitch as the first switching elements 11 due to the presence of the pictogram surrounding gap 38, positions of the protrusions 61 only have to be moved appropriately. Even in that case, it is preferable to arrange the protrusions 61 such that a local density of the protrusions 61 is substantially the same as a density of the first switching elements 11 in the moving image display area 30. It is advisable to arrange the pictogram switching element 411 on an extension of any row of the first switching elements 11 in the moving image display area 30.

In the example shown in FIG. 27, the protrusions 61 have substantially the same structure as the first switching elements 11. A dummy gate electrode 414 consisting of a chromium-molybdenum film is formed on the first substrate 1, an insulating film (not shown) consisting of silicon nitride film is formed on the dummy gate electrode 414, a semiconductor layer 416 consisting of an amorphous silicon (a-Si) film is formed on the insulating film, and a dummy source electrode 418 and a dummy drain electrode 419 consisting of a chrome film are formed via an impurity doped semiconductor layer (not shown).

When the protrusions 61 are provided above the pictogram display electrode 33a or the pictogram display surrounding electrode 37, that is, between the pictogram display electrode 33a or the pictogram display surrounding electrode 37 and the opposed electrode 17, it is preferable that the dummy gate electrode 414, the dummy source electrode 418, and the dummy drain electrode 419 are short-circuited with the pictogram display electrode 33a or the pictogram display surrounding electrode 37. This is because, if the dummy gate electrode 414, the dummy source electrode 418, or the dummy drain electrode 419 of a certain protrusion 61 has a potential different from that of the pictogram display electrode 33a or the pictogram display surrounding electrode 37 due to some cause, a potential difference between the pictogram display electrode 33a or the pictogram display surrounding electrode 37 and the opposed electrode 17 and a potential difference between the protrusion 61 and the opposed electrode 17 are different, and display in the protrusion 61 is different from display around the protrusion 61.

On the other hand, when the protrusions 61 are provided below the pictogram display electrode 33a or the pictogram display surrounding electrode 37, that is, between the pictogram display electrode 33a or the pictogram display surrounding electrode 37 and the first substrate 1, display in the protrusion 61 is never different from display around the protrusion 61 as described above. Therefore, the dummy gate electrode 414, the dummy source electrode 418, and the dummy drain electrode 419 may be short-circuited with one another or with the pictogram display electrode 33a or the pictogram display surrounding electrode 37, or may be insulated.

Note that the protrusion 61 is not always required to include all of the dummy gate electrode 414, the insulating film, the semiconductor layer 416, the impurity doped semiconductor layer, the dummy source electrode 418, and the dummy drain electrode 419 but may be formed of only a part of them.

The pictogram switching element 414 has the same structure as the first switching element 11. A gate electrode 404 consisting of a chromium-molybdenum film is formed on the first substrate 1, a gate insulating film (not shown) consisting of a silicon nitride film is formed on the gate electrode 404, a semiconductor layer 406 consisting of an amorphous silicon (a-Si) film is formed on the gate insulating film, and a source electrode 408 and a drain electrode 409 consisting of a chrome film are formed via an impurity doped semiconductor layer (not shown).

A gate wiring electrode 401 connected to the gate electrode 404 of the pictogram switching element 411 is connected to, for example, the integrated circuit for gate drive 41 (see FIG. 1) via a protective element. In other words, the pictogram switching element 411 is driven by the integrated circuit for gate drive 41. The gate wiring electrode 401 is provided in a wiring layer different from the second wiring electrode 3 and the other pictogram display wiring electrodes 40b and 40c (not shown for simplification of the drawing) or formed astride these wiring electrodes 3, 40b, and 40c via a conductive hole so as not to be short-circuited with the wiring electrodes 3, 40b, and 40c.

The source electrode 408 of the pictogram switching element 411 is connected to the pictogram display wiring electrode 40a. In addition, the drain electrode 409 of the pictogram switching element 411 is electrically connected to the pictogram display electrode 33a via the conductive hole for pictogram display 34.

The protrusions 61 and the pictogram switching element 411 with the above-mentioned structure are manufactured simultaneously with the first switching elements 11 in the moving image display area 30. In other words, the gate wiring electrode 401, the gate electrode 404 of the pictogram switching element 414 connected to the gate wiring electrode 401, and the dummy gate electrodes 414 of the protrusions 61 are formed simultaneously with the gate electrodes 4 of the first switching elements 11. The gate insulating film of the pictogram switching element 411 and the insulating films of the protrusions 61 are formed simultaneously with the gate insulating films 5 of the first switching elements 11. The pictogram switching element 411 and the semiconductor layers 406 and 416 of the protrusions 61 are formed simultaneously with the semiconductor layer 6 of the first switching element 11. The pictogram switching element 411 and the impurity doped semiconductor layers of the protrusions 61 are formed simultaneously with the impurity doped semiconductor layers 7 of the first switching elements 11. The pictogram display wiring electrode 40a, the source electrode 408 of the pictogram switching element 411 connected to the pictogram display wiring electrode 40a, and the dummy source electrodes 418 of the protrusions 61 are formed simultaneously with the source electrodes 8 of the first switching elements 11. The drain electrode 409 of the pictogram switching element 411 and the dummy drain electrodes 419 of the protrusions 61 are formed simultaneously with the drain electrodes 9 of the first switching elements 11.

As it is evident from the above explanation, dummy switching elements (protrusions) simulating the first switching elements in the moving image display area are arranged in the pictogram display area with the distribution as the distribution of the first switching elements in the moving image display area, whereby the thickness of the liquid crystal layer is uniform in the moving image display area and the pictogram display area. Thus, a uniform display quality is obtained.

Twelfth Embodiment

Figure 28:
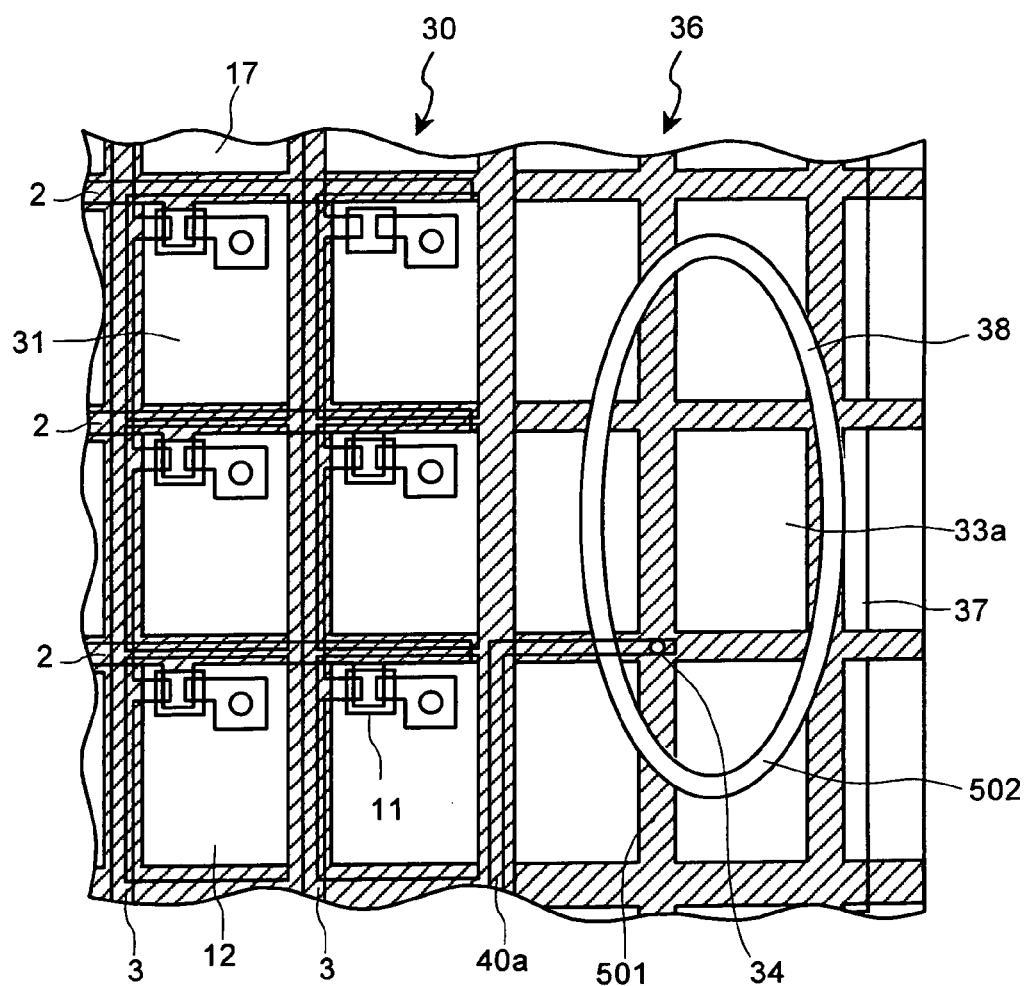
FIG. 28 is a plan view showing a part of a liquid crystal display panel in a twelfth embodiment of the present invention in enlargement.

A liquid crystal display panel in a twelfth embodiment of the present invention will be hereinafter explained with reference to the drawings. FIG. 28 is a plan enlarged view of the vicinity of the pictogram display electrode 33a in the twelfth embodiment. Note that, although the elliptical pictogram display electrode 33a will be explained for convenience of explanation, the same holds true for other pictograms.

Characteristics of the twelfth embodiment is that a black matrix 501 is provided in the moving image display area 30 and the pictogram display area 36, and a part of this black matrix 501 overlapping the pictogram surrounding gap 38 is formed as a cutout portion 502. As shown in FIG. 28, the black matrix 501 is formed in a pattern of a lattice shape surrounding respective pixels arranged in a matrix shape of the moving image display area 30.

A pixel portion consisting of the pictogram display electrode 33a in the pictogram display area 36 has a shape different from each pixel portion 31 of the moving image display area 30 and is larger than each pixel portion 31 in the moving image display area 30. Thus, if the black matrix 501 in the pictogram display area 36 is formed in completely the same pattern as the black matrix 501 in the moving image display area 30, the pictogram surrounding gap 38 between the pictogram display electrode 33a and the pictogram display surrounding electrode 37 and the black matrix 501 cross in the pictogram display area 36. Therefore, when the liquid crystal display panel is viewed from the second substrate 15 side, the black matrix 501 is seen from the pictogram surrounding gap 38, which is not preferable in terms of display quality.

Thus, in the twelfth embodiment, a part of the black matrix 501 overlapping the pictogram surrounding gap 38 is cut out to prevent the black matrix 501 from being seen from the pictogram surrounding gap 38 when the liquid crystal panel is viewed from the second substrate 15 side. Although not specifically limited, in the twelfth embodiment, the pattern of the black matrix 501 in the moving image display area 30 and the pattern of the black matrix 501 in the pictogram display area 36 are completely the same except that the cutout portion 502 is provided in the pattern of the black matrix 501 in the pictogram display area 36.

As shown in FIG. 28, the pictogram display wiring electrodes 40 (only the pictogram display wiring electrode 40a is shown in FIG. 28 to simplify the drawing) are arranged below the black matrix 501 in a boundary part of the moving image display area 30 and the pictogram display area 36. Therefore, these wiring electrodes are not seen from the outside. The pictogram display wiring electrode 40a is electrically connected to the pictogram display electrode 33a via the conductive hole for pictogram display 34. The conductive hole for pictogram display 34 is also provided below the black matrix 501.

As it is evident from the above explanation, since the black matrix of substantially the same pattern is provided in the moving image display area and the pictogram display area, brightness of the moving image display area and brightness of the pictogram display area are the same. Thus, a high display quality is obtained. Since the black matrix in the part overlapping the pictogram surrounding gap is cut out, the black matrix is not seen from this gap. Thus, a high display quality is obtained.

Note that, although the pattern of the black matrix is substantially the same in the moving image display area and the pictogram display area, the present invention is not limited to this, and the pattern of the black matrix may be different in the moving image display area and the pictogram display area. For example, the black matrix in the pictogram display area may be arranged in a pattern along a shape of the pictogram display electrode. As an example, when the pictogram display electrode has a star shape, it is advisable that the black matrix at vertexes of the star shape is in a pattern of a triangle rather than square. This makes it possible to display a desired pictogram with high reproducibility.

Thirteenth Embodiment

Figure 29:
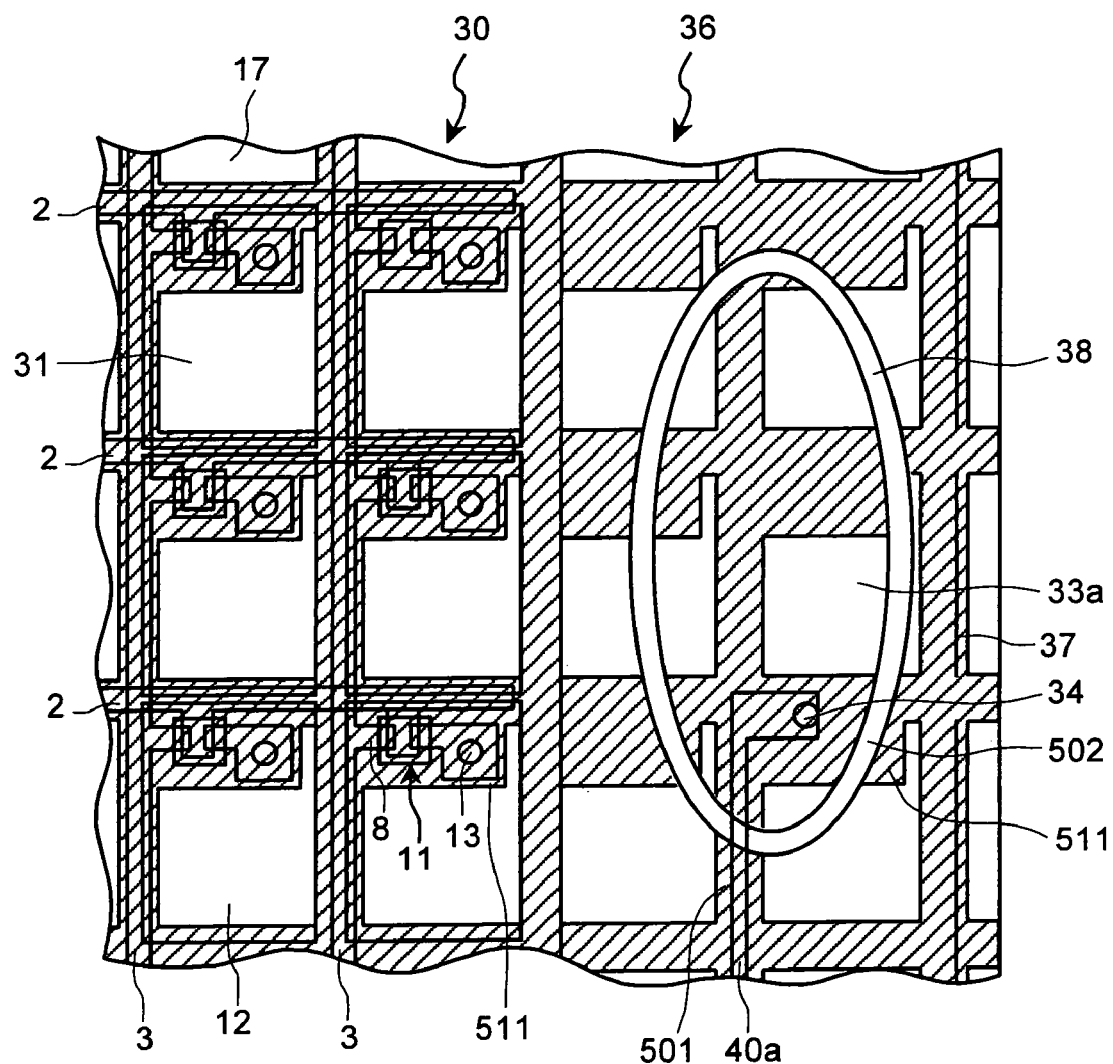
FIG. 29 is a plan view showing a part of a liquid crystal display panel in a thirteenth embodiment of the present invention in enlargement.

A liquid crystal display panel in a thirteenth embodiment of the present invention will be hereinafter explained with reference to the drawings. FIG. 29 is a plan enlarged view of the vicinity of the pictogram display electrode 33a in the thirteenth embodiment. Note that, although the elliptical pictogram display electrode 33a will be explained for convenience of explanation, the same holds true for other pictograms.

Characteristics of the thirteenth embodiment are that a wide portion (hereinafter, "wide black matrix portion") covering a wide pad portion, in which the first switching element 11 of the moving image display area 30 and the conductive hole for display electrode 13 connected to the source electrode 8 of the switching element 11 are arranged, is provided in the black matrix 501, and the conductive hole for pictogram display 34 is arranged in the wide black matrix portion 511 in the pictogram display area 36.

The thirteenth embodiment is the same as the twelfth embodiment in that the black matrix 501 of substantially the same pattern is provided in the moving image display area 30 and the pictogram display area 36, and the part of this black matrix 501 overlapping the pictogram surrounding gap 38 is formed as the cutout portion 502.

In the thirteenth embodiment, although not specifically limited, a width of the pictogram display wiring electrodes 40 (only the pictogram display wiring electrode 40a is shown in FIG. 29 to simplify the drawing) is wider below the wide black matrix portion 511. In addition, the pictogram display wiring electrodes 40 are arranged below the black matrix 501 in the pictogram display area 36.

As it is evident from the above explanation, brightness of the moving image display area and brightness of the pictogram display area are the same, and the black matrix is not seen from the pictogram surrounding gap. Thus, a high display quality is obtained. Further, since the conductive hole for display electrode is arranged in-the wide part of the pictogram display wiring electrodes, a diameter of the conductive hole for display electrode can be increased. Thus, a contact resistance is reduced.

Although not shown in the figure, plural conductive holes for display electrode 13 or plural conductive holes for pictogram electrode 34 are provided in the wide black matrix portion 511, whereby conduction by other conductive holes becomes possible even when conduction secured by a conductive hole in one part is insufficient, and defective display can be prevented.

Fourteenth Embodiment

Figure 30:
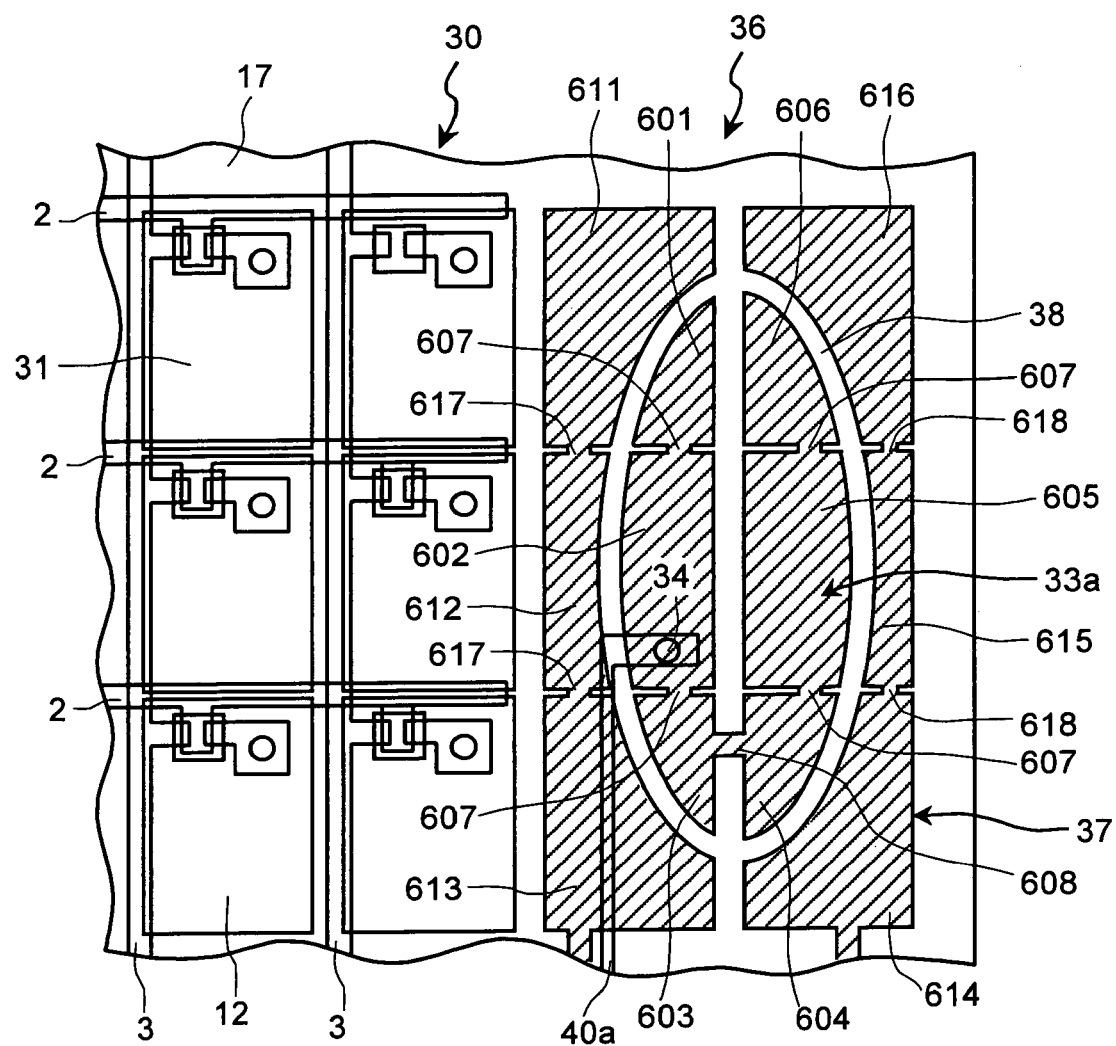
FIG. 30 is a plan view showing a part of a liquid crystal display panel in a fourteenth embodiment of the present invention in enlargement.

A liquid crystal display panel in a fourteenth embodiment of the present invention will be hereinafter explained with reference to the drawings. FIG. 30 is a plan enlarged view of the vicinity of the pictogram display electrode 33a in the fourteenth embodiment. Note that, although the elliptical pictogram display electrode 33a will be explained for convenience of explanation, the same holds true for other pictograms.

Characteristics of the fourteenth embodiment are that the pictogram display area 36 is constituted by plural individual display electrodes arranged in a matrix shape in the same manner as the moving image display area 30, and the individual display electrodes are electrically connected to one another by coupling portions. The pictogram display electrode 33a is divided into, for example, six individual display electrodes 601, 602, 603 604, 605, and 606. These six individual display electrodes 601, 602, 603, 604, 605, and 606 are coupled by coupling portions 607 and 608. The pictogram display wiring electrode 40a is electrically connected to the individual display electrode 602 via the conductive hole for pictogram display. In FIG. 30, the other pictogram display wiring electrodes 40*b* and 40*c* are not shown.

The pictogram display surrounding electrode 37 is divided into, for example, six individual display electrodes 611, 612, 613, 614, 615, and 616. Although not specifically limited, as shown in FIG. 30, the respective individual display electrodes 611, 612, 613, 614, 615, and 616 of the pictogram display surrounding electrode 37 are formed in the same rectangular shape as the display electrode 12 in the moving image display area 30 according to combinations with the respective individual display electrodes 601, 602, 603, 604, 605, and 606 of the pictogram display electrode 33*a*.

In the example shown in FIG. 30, the three individual display electrodes 611, 612, and 613 of the pictogram display surrounding electrode 37 are coupled by coupling portions 617. The remaining three individual display electrodes 614, 615, and 616 of the pictogram display surrounding electrode 37 are coupled by other coupling portions 618. One set of the individual display electrodes 611, 612, and 613 and the other set of the individual display electrodes 614, 615, and 616 are connected to the integrated circuit for source drive 42 (see FIG. 1) via protective elements separately. In other words, the two sets of individual display electrodes of the pictogram display surrounding electrode 37 are driven by the integrated circuit for source drive 42 separately.

As it is evident from the above explanation, since the pictogram display surrounding electrode is divided into two sets of individual display electrodes, a pictogram display surrounding electrode with a large area can be driven as an electrode with a small area. Thus, a capacity load due to liquid crystal is reduced. In addition, since the individual display electrodes of the pictogram display electrode are coupled via the coupling portions, an area of the pictogram display electrode is reduced. Thus, a capacity load due to liquid crystal is reduced. Therefore, since a load on a circuit for driving the pictogram display electrode and the pictogram display surrounding electrode is reduced, display quality is improved.

Fifteenth Embodiment

Figure 31:
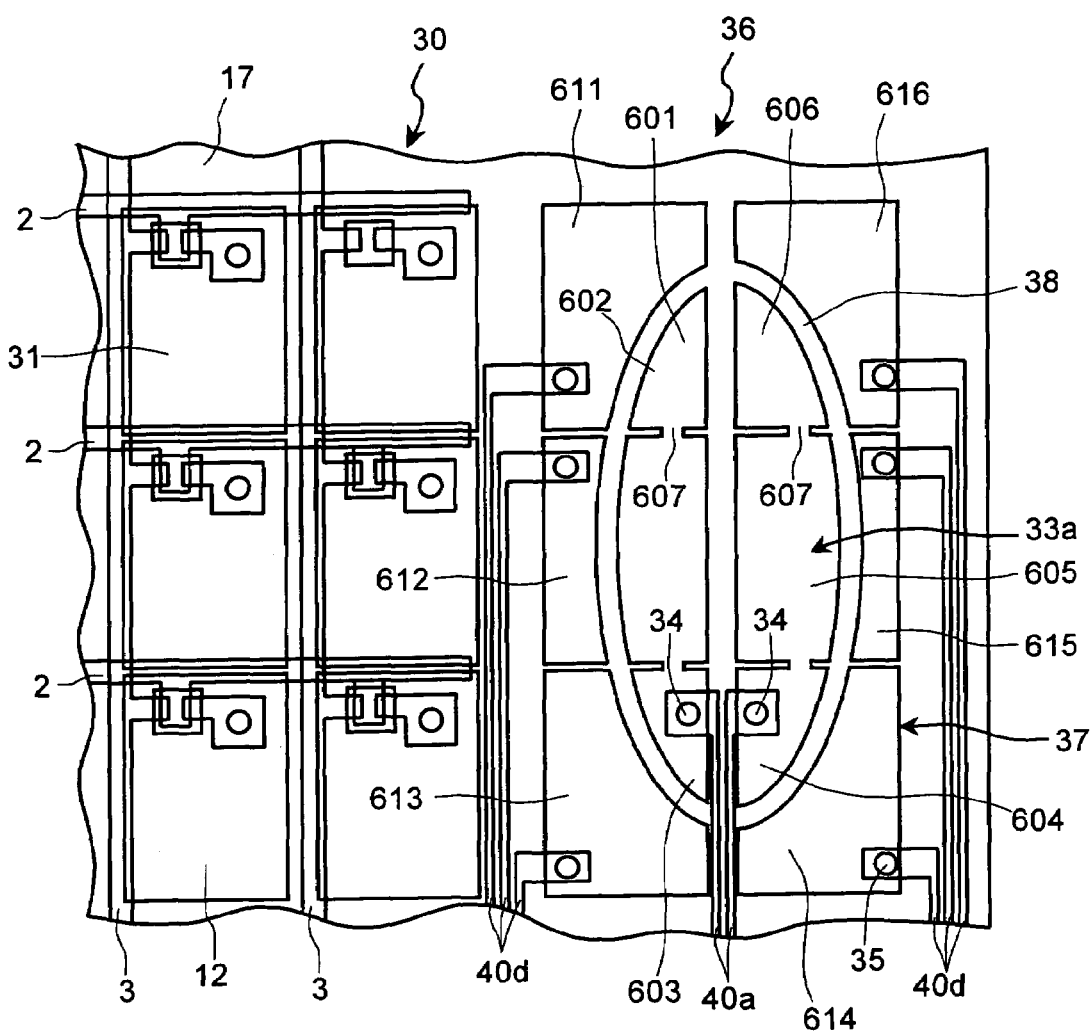
FIG. 31 is a plan view showing a part of a liquid crystal display panel in a fifteenth embodiment of the present invention in enlargement.

A liquid crystal display panel in a fifteenth embodiment of the present invention will be hereinafter explained. FIG. 31 is a plan enlarged view of the vicinity of the pictogram display electrode 33*a* in the fifteenth embodiment. Note that, although the elliptical pictogram display electrode 33*a* will be explained for convenience of explanation, the same holds true for other pictograms.

Characteristics of the fifteenth embodiment are that the pictogram display area 36 is constituted by plural individual display electrodes arranged in a matrix shape in the same manner as the moving image display area 30, and the respective individual display electrodes are driven separately or the plural individual display electrodes are electrically connected by coupling portions and driven.

Although not specifically limited, for example, the three individual display electrodes 601, 602, and 603 (hereinafter, "first individual display electrode group") of, for example, the six individual display electrodes 601, 602, 603, 604, 605, and 606 constituting the pictogram display electrode 33*a* are coupled by the coupling portions 607. The pictogram display wiring electrode 40*a* is electrically connected to the individual display electrode 603 of the first individual display electrode group via the conductive hole for pictogram display 34. The remaining three individual display electrodes 604, 605, and 606 (hereinafter, "second individual display electrode group") of the pictogram display electrode 33*a* are coupled by the other coupling portions 607. Another pictogram display wiring electrode 40*a* is electrically connected to the individual display electrode 604 of the second individual display electrode group via the conductive hole for pictogram display 34. In other words, the first individual display electrode group and the second individual display electrode group constituting the pictogram display electrode 33*a* are driven by the integrated circuit for source drive 42 (see FIG. 1) separately. Note that the respective individual display electrodes 601, 602, 603, 604, 605, and 606 may be driven individually without providing the coupling portions 607.

The pictogram display surrounding electrode 37 is divided into, for example, the six individual display electrodes 611, 612, 613, 614, 615, and 616. The respective individual display electrodes 611, 612, 613, 614, 615, and 616 of the pictogram display surrounding electrode 37 are connected to individual wiring electrodes 40*d* via the conductive holes 35, respectively. The respective wiring electrodes 40*d* are connected to the integrated circuit for source drive 42 (see FIG. 1) via protective elements. In other words, the respective individual display electrodes 611, 612, 613, 614, 615, and 616 of the pictogram display surrounding electrode 37 are driven by the integrated circuit for source drive 42 separately. Note that every plural pieces of the respective individual display electrodes 611, 612, 613, 614, 615, and 616 of the pictogram display surrounding electrode 37 may be coupled and driven.

Although not specifically limited, as shown in FIG. 31, the respective individual display electrodes 611, 612, 613, 614, 615, and 616 of the pictogram display surrounding electrode 37 are formed in the same rectangular shape as the display electrodes 12 in the moving image display area 30 according to combinations with the respective individual display electrodes 601, 602, 603, 604, 605, and 606 of the pictogram display electrode 33*a*. Note that, in FIG. 31, the other pictogram display wiring electrodes 40*b* and 40*c* and the wiring electrodes, which electrically connect the individual display electrodes arranged around the other pictogram display electrodes 33*b* and 33*c* of the pictogram display surrounding-electrode 37 and the integrated circuit for source drive 42 (see FIG. 1), are not shown.

As it is evident from the above explanation, since the pictogram display surrounding electrode is divided into plural individual display electrodes, a pictogram display surrounding electrode with a large area can be driven as an electrode with a small area. Thus, a capacity load due to liquid crystal is reduced. In addition, since the pictogram display electrode is divided into plural display electrodes, the pictogram display electrode can be driven as an electrode with a small area. Thus, a capacity load due to liquid crystal is reduced. Therefore, since a load on a circuit for driving the pictogram display electrode and the pictogram display surrounding electrode is reduced, display quality is improved.

Figure 26:
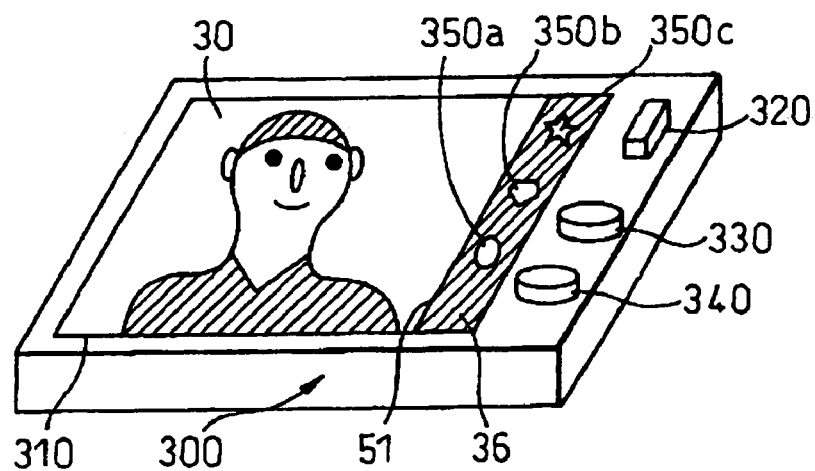
FIG. 26 is a perspective view of a portable device that is constituted using the liquid crystal display panel of the present invention.

FIG. 26 shows a portable device 300 like a PDA that is constituted using the liquid crystal display panel according to the embodiments of the present invention. A display 310 of this device is constituted by the liquid crystal display panel of the present invention having the moving image display area 30 and the pictogram display area 36. For example, a power button 320 and first and second operation buttons 330 and 340 are provided in a device body. Respective pictograms 350*a*, 350*b*, and 350*c* in the pictogram display area 36 are formed by the pictogram display electrodes. For example, the pictogram 350a indicates a sound off state, the pictogram 350b indicates a power on state, and the pictogram 350c indicates a contrast. The partitioning line 51 is provided between the moving image display area 30 and the pictogram display area 36 to clearly show the pictogram display area 36.

In each of the embodiments of the present invention, the embodiment, in which, when the switching elements are provided, a load capacitor to be connected to a moving image display pixel (liquid crystal capacitor of a pixel portion) or a pictogram display pixel (liquid crystal capacitor of a pictogram pixel) in parallel is not provided, is described. However, the present invention is also effective in a structure in which a load capacitor is provided.

In each of the embodiments of the present invention, the structure, in which the source side protective element is provided adjacent to the protective element for pictogram, is described. However, it is needless to mention that the present invention is also effective in a structure in which the protective element for pictogram is provided adjacent to the gate side protective element.

In each of the embodiments of the present invention, the structure, in which the thin-film transistor TFT is connected in a form of a ring as the protective element, is explained. However, PN junction, a method of connecting PIN junction diodes in a form of a ring, and the like are also effective.

In each of the embodiments of the present invention, although a capacitor for charge retention is not connected to the switching element outside display area, when display is retained for a long time or a gradation state is retained with high accuracy, it is advisable to connect the capacitor for charge retention with the liquid crystal in the pictogram display pixel portion in parallel. In particular, if display is retained for about one minute, it is preferable not to provide the capacitor for charge retention to eliminate power consumed by charge and discharge of the capacitor for charge retention.

As it is evident from the above explanation, according to the present invention, the protective elements are provided in the outer periphery of the pictogram display area. This makes it possible to prevent deterioration of liquid crystal or electrostatic discharge damage to the pictogram display wiring electrodes and the pictogram display surrounding electrode.

The partitioning line is provided in at the boundary part of the moving image display area and the pictogram display area. This makes it possible to clearly show a display area of the pictogram display area. In addition, the partitioning line is formed of a member constituting the liquid crystal display panel. This makes it possible to form the partitioning line without applying a load to a process.

There is a blindfold effect for the pictogram display wiring electrodes by forming the partitioning line with a light-shielding member. Thus, display quality of a pictogram can be improved.

The switching element outside display areas are provided around the pictogram display area to control low resistance connection and high resistance connection for the pictogram display pixels and the external circuit, whereby a frequency for inversion drive for the pictogram display pixels is reduced to make low power consumption drive possible. Thus, this is an effective method for, in particular, to a portable device.

The protrusions are arranged as the dummy switching elements in the pictogram display area, whereby the thickness of the liquid crystal layer is uniform in the moving image display area and the pictogram display area. Thus, a uniform display quality is obtained.

The black matrix of the same pattern is present in the moving image display area and the pictogram display area, whereby brightness of the moving image display area and brightness of the pictogram display area are the same. In addition, the black matrix is cut out in the gap between the pictogram display electrode and the pictogram display surrounding electrode, whereby the black matrix is not seen from the gap. Therefore, a high display quality is obtained.

The pixel portions in the pictogram display area are formed in a fixed pictogram shape by the plural individual display electrodes, which are electrically connected to one another via the coupling portions, whereby an area of the pixel portions in the pictogram display area is reduced, and a capacity load due to liquid crystal is reduced. Consequently, since a load on the drive circuit for driving the pixel portions in the pictogram display area is reduced, display quality is improved.

The pixel portions in the pictogram display area are formed in a fixed pictogram shape by the plural individual display electrodes, and the respective individual display electrodes are connected to the drive circuit individually via the respective pictogram display wiring electrodes, whereby an area of the pixel portions in the pictogram display area is further reduced, and a capacity load due to liquid crystal is further reduced. Therefore, since a load on the drive circuit for driving the pixel portions in the pictogram display area is further reduced, display quality is further improved.

INDUSTRIAL APPLICABILITY

As described above, the present invention is suitable for providing a new liquid crystal display panel that is resistant to damage to pixels due to static electricity and has a high display quality in both the moving image display area and the pictogram display area, and in which display quality of the pictogram display area does not fall even if low power consumption drive is performed.

The invention claimed is:

1. A liquid crystal display panel that includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions, comprising:
   a moving image display area in which the pixel portions are arranged in a matrix shape;
   a pictogram display area in which the pixel portions are formed in a fixed pictogram shape; and
   an active partitioning line that divides the moving image display area and the pictogram display area.

2. The liquid crystal display panel according to claim 1, wherein the partitioning line is constituted by a first partition wiring formed on the first substrate and a second partition wiring formed on the second substrate with a liquid crystal layer between the first partition wiring and the second partition wiring.

3. The liquid crystal display panel according to claim 1, wherein the partitioning line is an area with a reflectance lower than that of at least one of the moving image display area and the pictogram display area.

4. The liquid crystal display panel according to claim 1, further comprising a partitioning pixel portion consisting of a first partitioning wiring and a second partitioning wiring, which are opposed to each other via liquid crystal and are controlled to perform one of blinking display and reversal display of a pictogram.

5. The liquid crystal display panel according to claim 1, further comprising an uneven organic film and a moat for said partitioning line on the first substrate, so that a reflectance in the area can be made lower than that of the other areas.

6. A liquid crystal display panel that includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions, comprising:
 a moving image display area in which the pixel portions are arranged in a matrix shape;
 a pictogram display area in which the pixel portions are formed in a fixed pictogram shape; and
 a partitioning line that divides the moving image display area and the pictogram display area,
 wherein the pictogram display area includes pictogram display wiring electrodes that wire the pictogram display electrode provided in the area to the outside of the pictogram display area, and the pictogram display wiring electrodes are (1) arranged in an area in which the partitioning line is formed, (2) are at least transverse to the display areas, and (3) do not enter the moving image display area.

7. The liquid crystal display panel according to claim 6, wherein the partitioning line is an area with a reflectance lower than that of at least one of the moving image display area and the pictogram display area.

8. The liquid crystal display panel according to claim 6, further comprising at least one black matrix operative to reduce at least reflectance.

9. A liquid crystal display panel that includes a first substrate, a second substrate, a liquid crystal layer encapsulated between the first substrate and the second substrate, display electrodes provided on the first substrate, and opposed electrodes provided on the second substrate, and in which overlapping portions of the display electrodes and the opposed electrodes are formed as pixel portions, comprising:
 a moving image display area in which the pixel portions are arranged in a matrix shape;
 a pictogram display area in which the pixel portions are formed in a fixed pictogram shape; and
 a partitioning line that divides the moving image display area and the pictogram display area,
 wherein the partitioning line includes at least one of an area in which color filters of at least two colors are laid one on top of another in a direction of light transmission and a black matrix area.

10. The liquid crystal display panel according to claim 9, wherein the partitioning line is an area with a reflectance lower than that of at least one of the moving image display area and the pictogram display area.

11. The liquid crystal display panel according to claim 9, further comprising at least one black matrix operative to reduce at least reflectance.

* * * * *